US012629239B2

(12) United States Patent
Van Dijk et al.

(10) Patent No.: US 12,629,239 B2
(45) Date of Patent: May 19, 2026

(54) DENTIFRICE DISPENSER, ASSEMBLY OF SUCH A DISPENSER AND J-/U-SHAPED MOUTHPIECE FOR CLEANING TEETH, SYSTEM COMPRISING A DENTAL CLEANER AND STORAGE STATION WITH SUCH A DISPENSER, USE OF SUCH A DISPENSER, AND METHOD MAKING USE OF SUCH A DISPENSER

(71) Applicant: DENTAL ROBOTICS GROUP B.V., Delft (NL)

(72) Inventors: Joppe Gideon Van Dijk, Rotterdam (NL); Tim Anton Snijder, Rotterdam (NL); Thomas Van De Water, The Hague (NL); Salvador Emilio Lluch Sicard, The Hague (NL); Daan Maarten Domhof, Amsterdam (NL)

(73) Assignee: Dental Robotics Group B.V., Delft (NL)

( * ) Notice: Subject to any disclaimer, the term of this patent is extended or adjusted under 35 U.S.C. 154(b) by 498 days.

(21) Appl. No.: 18/248,412

(22) PCT Filed: Oct. 12, 2021

(86) PCT No.: PCT/EP2021/078124
§ 371 (c)(1),
(2) Date: Apr. 10, 2023

(87) PCT Pub. No.: WO2022/078994
PCT Pub. Date: Apr. 21, 2022

(65) Prior Publication Data
US 2023/0404728 A1 Dec. 21, 2023

(30) Foreign Application Priority Data
Oct. 12, 2020 (NL) ...................................... 2026658

(51) Int. Cl.
*A61C 17/22* (2006.01)

(52) U.S. Cl.
CPC .......... *A61C 17/227* (2013.01); *A61C 17/228* (2013.01)

(58) Field of Classification Search
CPC ... A61C 17/227; A61C 17/228; A61C 17/222; A61C 7/08; A61C 19/063; A46B 11/06; A46B 11/063
(Continued)

(56) References Cited

U.S. PATENT DOCUMENTS

| 8,292,624 B2 * | 10/2012 | Gallagher, Jr. .... A46B 11/0003 |
| | | 433/216 |
| 11,058,523 B2 | 7/2021 | Pai et al. |

(Continued)

FOREIGN PATENT DOCUMENTS

| CN | 105899162 | 8/2016 |
| JP | 2011-511669 | 4/2011 |

(Continued)

OTHER PUBLICATIONS

International Search Report and the Written Opinion of the International Searching Authority issued in International Application PCT/EP2021/078124 mailed Jan. 25, 2022.
(Continued)

*Primary Examiner* — David J Walczak

(57) ABSTRACT

A dentifrice dispenser for dispensing a dentifrice onto a J-shaped or U-shaped mouthpiece is configured for simultaneously encompassing and cleaning a plurality of dental positions with the dispensed dentifrice and with cleaning elements provided on or in the mouthpiece. The dispenser comprises a dispenser duct work having an inlet and a manifold. The manifold comprises a multiple of outlet openings configured for dispensing dentifrice. The duct
(Continued)

work is configured for passing dentifrice from the inlet to the outlet openings. The outlet openings are distributed along a J-shaped or U-shaped curvature and debouch towards and/or along the curvature, which matches at least part of a dental arch such that the outlet openings can dispense dentifrice simultaneously on a multiple of locations along the curvature, the multiple of locations corresponding to the multiple of outlet openings.

19 Claims, 11 Drawing Sheets

(58) Field of Classification Search
USPC ........... 401/9–11; 222/52; 433/6, 34, 37, 42, 433/43, 216
See application file for complete search history.

(56) References Cited

U.S. PATENT DOCUMENTS

| | | | |
|---|---|---|---|
| 11,160,362 B2 * | 11/2021 | Beckman | .............. A61C 17/20 |
| 2013/0260332 A1 | 10/2013 | Shapiro | |

| | | | |
|---|---|---|---|
| 2018/0116773 A1 | 5/2018 | Chen et al. | |
| 2018/0184857 A1 | 7/2018 | Pai | |
| 2019/0000599 A1 | 1/2019 | Hanuschik et al. | |
| 2020/0253369 A1 | 8/2020 | De Gentile et al. | |

FOREIGN PATENT DOCUMENTS

| | | |
|---|---|---|
| JP | 2015-509430 | 3/2015 |
| JP | 2017-500956 | 1/2017 |
| JP | 2020-526362 | 8/2020 |
| WO | 2018/199760 | 11/2018 |
| WO | 2019/021109 | 1/2019 |
| WO | 2019/197310 | 10/2019 |
| WO | 2020/017963 | 1/2020 |

OTHER PUBLICATIONS

Search Report and the Written Opinion issued in Application No. NL 2026658 mailed Jun. 8, 2021.

* cited by examiner

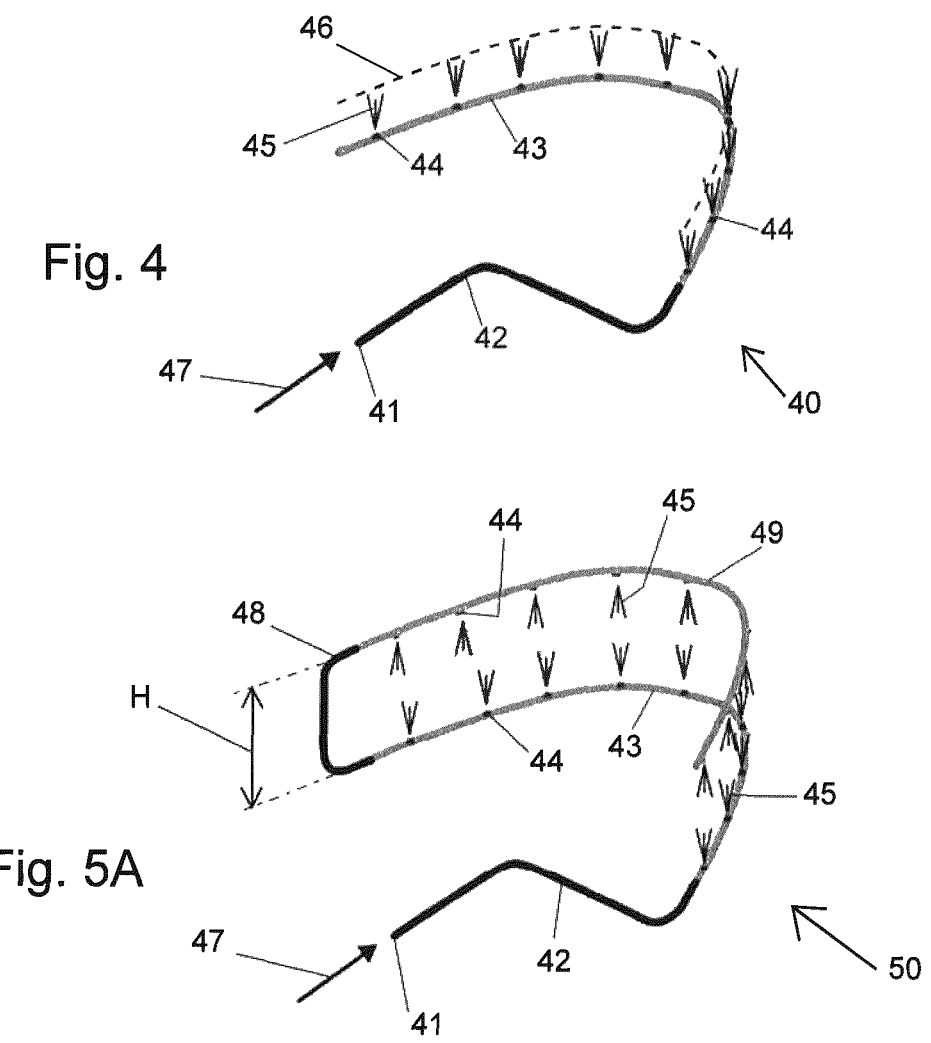
Fig. 4
Fig. 5A
Fig. 5B
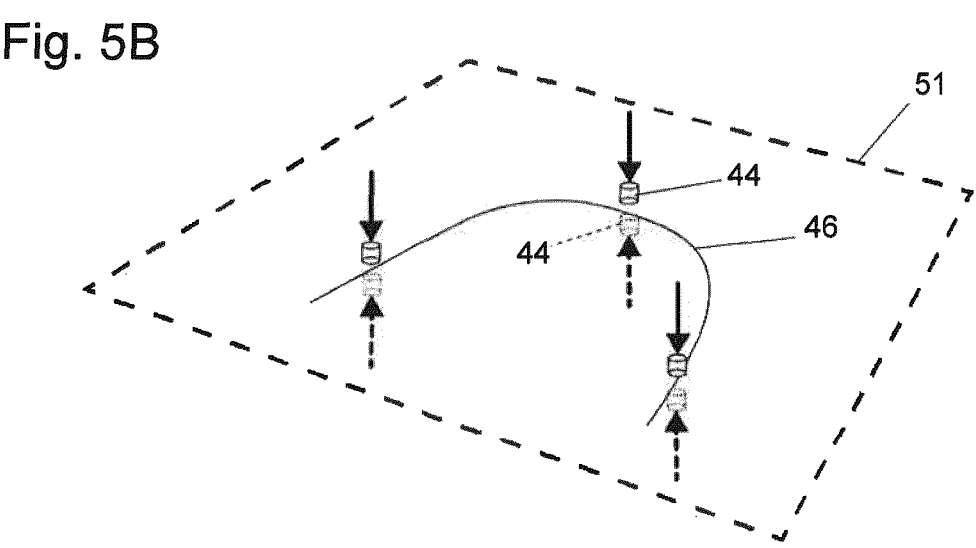

DENTIFRICE DISPENSER, ASSEMBLY OF SUCH A DISPENSER AND J-/U-SHAPED MOUTHPIECE FOR CLEANING TEETH, SYSTEM COMPRISING A DENTAL CLEANER AND STORAGE STATION WITH SUCH A DISPENSER, USE OF SUCH A DISPENSER, AND METHOD MAKING USE OF SUCH A DISPENSER

INTRODUCTION

The invention relates to the field of J-shaped or U-shaped mouthpieces for simultaneously encompassing and cleaning a plurality of dental positions with cleaning elements provided on the mouthpiece. The cleaning may be brushing with bristles as cleaning elements. For encompassing the upper dental positions and/or lower dental positions, the mouthpiece—to which field the invention relates—defines an upper trough and/or lower trough, which troughs have a J-shaped respectively U-shaped length direction. For cleaning the dental positions the cleaning elements of the mouthpiece may be provided inside the trough.

These J-shaped or U-shaped mouthpieces—to which field the invention relates—are especially used in the daily care of teeth and require for the daily care a dentifrice to be applied onto the mouthpiece. The dentifrice is usually applied from a tube of toothpaste or from a container comprising liquid dentifrice through an orifice as a foam onto the mouthpiece.

The present invention is more specifically directed to a dentifrice dispenser for dispensing a dentifrice onto a J-shaped or U-shaped mouthpiece configured for simultaneously encompassing and cleaning a plurality of dental positions with the dispensed dentifrice and with cleaning elements provided on the mouthpiece, such as in a trough of the mouthpiece.

The dispenser according to the invention may for example be used for J-shaped or U-shaped mouthpieces known from earlier patent applications of applicant, like WO-2018/199760, WO-2020/017963, and the not yet published NL patent applications NL-2025996, NL-2025997, and NL-2025996.

BACKGROUND OF THE INVENTION

According to the prior art, the dentifrice is dispensed from the outlet opening—for example the dentifrice may be a paste dispensed from a toothpaste tube—whilst moving the outlet opening and mouthpiece relative to each other in order to distribute the dentifrice along the J-shaped or U-shaped length of the mouthpiece.

According to the invention as well as in general: a dentifrice is an agent used along with a dental cleaner, such as a toothbrush, for the daily care of dental positions with or without teeth. A dentifrice is usually supplied in paste, powder, gel, liquid or foam form. According to the invention, a dental position is a position in the denture associated to a tooth, in which the tooth may be present (such as in in the form of a natural or artificial tooth or a partly natural and partly artificial tooth) or absent.

The object of the invention is to provide an alternative dentifrice dispenser for dispensing a dentifrice onto a J-shaped or U-shaped mouthpiece configured for simultaneously encompassing and cleaning a plurality of dental positions with the dispensed dentifrice and with cleaning elements provided on the mouthpiece. A further object of the invention is to provide a dentifrice dispenser which is easy in use and separate from the mouthpiece. A still further object of the invention is to provide a dentifrice dispenser providing a good distribution of dentifrice over the mouthpiece.

In relation to U-shaped mouthpieces it is known from US-2013/0260332 to provide the mouthpiece with a network of tubules or conduits through which a pressurized spray pf cleaning solution is directed to targeted locations of a user's mouth. This network of tubules or conduits is incorporated in the mouthpiece and permanently affixed/secured to the mouthpiece by sandwiching the network between an inner layer and an outer layer of the mouthpiece. US-2019/0000559 discloses a similar mouthpiece, called oral insert, for providing personalized oral irrigation. Fluid openings integrated in the mouthpiece are positioned based on the individual oral or dental structures of a user's teeth to provide a customized fluid flow over the user's teeth. Fluid supply and fluid openings integrated in a mouthpiece do not go well with mouthpieces configured for brushing teeth, because brushing elements and fluid supply integrated into one single mouthpiece increase the size of the mouthpiece while the space available for the mouthpiece is limited in the mouth. US-2019/0000559 therefore provides a first mouthpiece for flossing by means of fluid and another second mouthpiece for brushing.

SUMMARY OF THE INVENTION

C1: One or more of the above objects are according to a first aspect of the invention achieved by providing a dentifrice dispenser for dispensing a dentifrice onto a J-shaped or U-shaped mouthpiece configured for simultaneously encompassing and cleaning a plurality of dental positions with the dispensed dentifrice and with cleaning elements provided on the mouthpiece;

wherein the dispenser comprises a dispenser duct work having an inlet and a manifold; wherein the manifold comprises a multiple of outlet openings configured for dispensing dentifrice;

wherein the dispenser duct work is configured for passing dentifrice from the inlet to the multiple of outlet openings;

wherein the outlet openings are distributed along a J-shaped or U-shaped curvature and debouch towards and/or along the curvature, the curvature matching at least part of a dental arch comprising a molar, pre-molars, a canine, and incisors—which incisors may comprise one or two lateral incisor and both the central incisors—such that the outlet openings can dispense dentifrice simultaneously on a multiple of locations along the curvature—and thus along the mouthpiece—, the multiple of locations corresponding to the multiple of outlet openings; and wherein the dispenser is configured to allow, after dentifrice has been dispensed onto the mouthpiece, withdrawal of the mouthpiece from the manifold.

The manifold according to the invention is a separate manifold, i.e. a manifold which is a part separate from the mouthpiece. The mouthpiece, on the one hand, and manifold with its plurality of outlet openings, on the other hand, thus are separate parts, in other words the manifold and its outlet openings are not integrated in the mouthpiece. The dentifrice is dispensed onto the mouthpiece whilst the mouthpiece is outside the mouth of the user and subsequently the mouthpiece is withdrawn from the manifold for inserting the mouthpiece (without manifold) in the mouth of the user for cleaning of dental position with the aid of the dentifrice.

The cleaning elements may according to a further embodiment be provided in a trough of the mouthpiece. The cleaning elements may for example comprise one or more of bristles, tufts of bristles, rubbing pads, and liquid nozzles for spraying or jetting a liquid, like water or a cleaning liquid, onto the dental positions, such as teeth and/or gum in absence of one or more teeth.

The dentifrice passed from the inlet of the dispenser duct work to the multiple outlets of the dispenser duct work may be pressurized to facilitate it being passed from the inlet of the dispenser duct work to the multiple of outlets of the dispenser duct work.

The J-shape or U-shape of the mouthpiece corresponds to at least part of the dental arch of a user.

By having the multiple of outlet openings of the separate manifold distributed along a J-shaped respectively U-shaped curvature matching the J-shape respectively U-shape of the mouthpiece—or said differently by having the multiple of outlet openings of the separate manifold distributed along a J-shaped respectively U-shaped curvature matching tat least part of a dental arch of a user—dentifrice is provided simultaneously on multiple locations along the mouthpiece. No relative movement of the outlets with respect to the mouthpiece is required during the dispensing. Both may be (kept) unmoveable with respect to each other during dispensing. The distribution of the outlets along the curvature being in practise a predetermined distribution ensures that all parts of the mouthpiece can be provided with sufficient dentifrice so that during cleaning all teeth encompassed by the mouthpiece are effectively treated with dentifrice.

C2-3: According to a further embodiment of the first aspect of the invention, the outlet openings are arranged at opposite sides of a plane defined by the curvature. This configuration allows, in a mouthpiece having an upper trough for treating an upper dental bow and a lower trough for treating a lower dental bow, both troughs being provided simultaneously with dentifrice in one go. According to a further embodiment of this embodiment, a first set of outlet opening may be arranged at one side of said plane and a second set of outlets may be arranged on the other side of said plane, and transverse to said plane the first set and second set may be distanced from each other. According to another further embodiment of this embodiment, the outlet opening are arranged in pairs mirrored with respect to the plane defined by the curvature.

C4: According to another further embodiment of the first aspect of the invention, the curvature is U-shaped. This embodiment allows efficient dispensing of dentifrice onto specifically an U-shaped mouthpiece.

In relation to especially a U-shaped mouthpiece, it is noted that the dimensions of the dental arch may vary from user to user. Not only age—like child, early adolescent, middle adolescent, late adolescent, young adult, adult—plays a role, but on top of this also differences from person to person. One of these varying dimensions is the width of the dental arch, i.e. the (horizontal) distance between (vertical) legs of the U. Another varying dimension—which depends in particular on the stage of dental development—is the length of the dental arch as viewed along the U-shape. As from about middle adolescence, the size of dental arches—especially the width of the U—may be divided in small, medium and large, but more refined subdivisions are possible and my include part of the age spectrum or all ages. Accordingly, the dimensions, like width and length, of the mouthpiece may vary as well.

C5: In order to be able to serve differently sized U-shaped mouthpieces, the manifold of the dispenser with U-shaped curvature is according to a further embodiment of the first aspect of the invention configured to adjust:

the U-shaped curvature to the U-shaped mouthpiece, more specifically to the dimensions, such as the width and/or length, of the mouthpiece, and/or the U-shaped mouthpiece to the U-shaped curvature, the U-shaped curvature being the U-shaped curvature along which the multiple of outlet openings is distributed.

C6: Adjustment of the U-shaped curvature to the U-shaped mouthpiece may according to a further embodiment of the first aspect of the invention be accomplished by adjustment of the mutual positioning of the multiple of outlet openings to conform the U-shaped curvature (along which the outlet openings are arranged) to the (dimensions of) the U-shaped mouthpiece. Adjustment of the mutual positioning of the multiple of outlet openings allows adjustment to take into account variations in width of the mouthpiece, to take into account variations in length of the mouthpiece, or to take into account variations in width and length of the mouthpiece. This may for example be accomplished with one or more sensors configured to sense the dimensions—such as width and/or length—of the mouthpiece and connected to a controller controlling one or more actuators to adjust mutual positioning of the multiple of outlet openings in correspondence with the sensed dimensions. These one or more sensors may be configured to sense the actual dimensions or may be configured to sense, such as read, a marking—like a physical marker, such as a barcode, QR-code, a colour or colour code; or a readable chip, such as an RFID (=radio frequency identification) or a PCB (=printed circuit board)—provided on the mouthpiece, which marking is representative for the dimensions of the mouthpiece.

C7: In addition to or as an alternative for adjustment of the U-shaped curvature to the U-shaped mouthpiece, the manifold may be configured to adjust the U-shaped mouthpiece to the U-shaped curvature along which the outlet openings are arranged. When the mouthpiece is a U-shaped mouthpiece having two leg parts connected by a central part, this may for example be accomplished when the manifold comprises a W-shaped receiving dock having two adjacent reception bays separated by a central member, wherein the dock is configured to receive the leg parts of the U-shaped mouthpiece in the reception bays when the leg parts of the mouthpiece are inserted in an insertion direction into the reception bays, wherein each receiving bay has an outer side wall and an inner side wall, the inner side walls being defined by the central member, wherein, viewed in the insertion direction, the central member widens, and wherein, viewed in the insertion direction, the outer side walls taper with respect to each other. When the legs of the mouthpiece have been inserted into the reception bays, the central part of the mouthpiece will so to say bridge the central member of the dock. The U-shaped curvature along which the outlet openings are arranged may in this embodiment have a fixed or adjustable configuration with respect to the W-shaped dock. The dimensions of the W-shaped receiving dock, more specifically the dimensions of the reception bays and central member, may according to a further embodiment be predefined and may for example be chosen such that a mouthpiece of predefined average width dimension will not be deformed when pushed with its legs into the reception bays. The free ends of the legs of the mouthpiece with predefined average width dimension will snugly fit in the reception bays without a play transvers to the length direction of the legs. When received in the receiving bays, the central member may for example, but not necessarily, snuggly fit in the space defined by the legs of the U-shaped mouthpiece of predefined average width. When a mouthpiece having a width smaller than the width of a mouthpiece of predefined average width is inserted into the receiving dock, the widening of the central member ensures that the legs of the mouthpiece of smaller width are spread to conform to the width of a mouthpiece of predefined average width. When a mouthpiece having a width larger than the width of a mouthpiece of predefined average width is inserted into the receiving dock, the taper of outer side wall walls with respect to each other ensures that the legs of the mouthpiece of larger width are so to say squeezed together to conform to the width of a mouthpiece of predefined average width.

C8: According to another further embodiment of the first aspect of the invention, the dispenser further comprises a dentifrice container for dentifrice and a feed section connecting the dentifrice container with the inlet and configured for transfer of dentifrice from the dentifrice container to the inlet.

C9-10: According to a further embodiment of the dispenser comprising a dentifrice container, the dispenser according to the first aspect of the invention may further comprise an actuation mechanism configured for controlling the transfer of dentifrice from the container to the inlet via the feed section. The actuation mechanism may comprise a release mechanism and control button connected or associated with the release mechanism. In case the container is pre-pressurized, the release mechanism may be a valve arranged in the feed section, which valve is opened upon actuation of the control button to allow pressurized dentifrice to pass to the inlet. In case the container is not pre-pressurized, the actuation mechanism may further be configured to pressurize the dentifrice to be passed or transferred through the duct work. For this purpose, the release mechanism may for example be configured to pressurize at least part of the dentifrice for transfer from the container into the inlet. Pressurizing the dentifrice may for example be by means of an electrically driven pump activated upon actuation of the control button or a mechanically driven pump driven by movement of the control button when the control button is pressed to move over a distance. In case of an electrically driven pump, the control button may for example be a sensor or electrical switch. In case of a mechanically driven pump driven by movement of a control button, one can think of mechanisms used in all kinds of foam and liquid dispensers for dispensing for example soap. The pump, such as said electrically driven pump, mechanically driven pump or any other pump, may be a part of the feed section. With respect to a pump it is noted that the pump, in case it is configured to act in a pipe or duct, will have a suction side and a pressure side, the suction side being at the side of the container and the pressure side being at the side of the duct work. Further it is noted that pressurizing may also be achieved by increasing the pressure in the dentifrice container, for example by means of an electrically or mechanically driven pump.

C11: According to another further embodiment of the dispenser comprising a dentifrice container, the container is a replaceable dentifrice cartridge. This allows an empty container to be replaced by a new one full with dentifrice.

C12: According to another further embodiment of the dispenser comprising a dentifrice container, the container comprises dentifrice.

C13: According to another further embodiment of the first aspect of the invention, the dentifrice may comprises one or more of:

a fluoride;

0.1-0.15 gram, such as 0.1125-0.1375 gram or about 0.125 gram, of an abrasive, in which the abrasive may comprise one or more of aluminum hydroxide, calcium hydrogen phosphates, calcium carbonate, silica and hydroxyapatite or a combination comprising one or more of these;

15-80% of weight, such as 20-40% of weight or 45-70% of weight, of water.

C14-16: According to another further embodiment of the dispenser comprising a dentifrice container, the container is dimensioned for containing a multiple of doses of dentifrice—such as 20 to 150 doses of dentifrice—, and wherein the actuation mechanism is configured to transfer one predetermined dose of dentifrice upon actuation of the actuating mechanism. According to a further embodiment of this embodiment of the first aspect of the invention, one dose of dentifrice may comprise 0.2 to 1.25 mg of fluoride, such as 0.20 to 0.40 mg of fluoride or 0.25 to 0.375 mg of fluoride, like about 0.335 to 0.34 mg of fluoride. The container may for example be dimensioned for containing a multiple of doses, which is for one person sufficient for one week, one month, three months or even a year. The container ay according to another further embodiment be configured for dispensing a predetermined dose or a dose determined by a controller on the basis of input received from a sensor or user interface.

C17: According to another further embodiment of the dispenser comprising a dentifrice with fluoride, the fluoride may according to the first aspect of the invention comprise one or more of: sodium fluoride, stannous fluoride, and monofluorophosphate or a combination comprising one or more of these.

C18: According to another further embodiment of the first aspect of the invention, the dispenser may further comprise a dose adjuster configured to adjust the dose of dentifrice to be dispensed. This may for example allow adjustment of the dose to take into account the size of a mouthpiece. Smaller mouthpieces may require a smaller dose than larger mouthpieces.

C19: According to another further embodiment of the first aspect of the invention, the dispenser may further comprise an indicator and at least one status sensor, which is configured for sensing the degree of filling of the container and/or the degree of use of the mouthpiece; wherein the indicator is connected with the status sensor and configured to generate an indicating signal representative for the degree sensed by the sensor or indicating when the degree sensed by the sensor is below respectively above a predetermined value. A sensor for sensing the degree of filling and associated indicator can inform the user when the dentifrice container is empty or close to empty. A sensor for sensing the degree of use and associated indicator can inform the user when the mouthpiece is or becomes to old for further use.

C20: According to a second aspect of the invention, the invention provides an assembly comprising a dispenser according to the first aspect of the invention and a J-shaped or U-shaped mouthpiece configured for simultaneously encompassing and cleaning a plurality of dental positions with dentifrice dispensed by the dispenser and with cleaning elements provided on the mouthpiece. In order to encompass the plurality of dental positions, the mouthpiece may comprise one or more troughs with the cleaning elements provided in the troughs. The cleaning elements may for example comprise one or more of bristles, tufts of bristles, rubbing pads, and liquid nozzles for spraying or jetting a liquid, like water or a cleaning liquid, onto the teeth.

C21: According to a third aspect of the invention, the invention provides a system comprising:
   a dental cleaner comprising a said J-shaped or U-shaped mouthpiece configured for simultaneously encompassing and cleaning a plurality of dental positions with cleaning elements provided on or in the mouthpiece, and
   a storage station for storing the J-shaped or U-shaped mouthpiece when not used for cleaning teeth,
   wherein the storage station comprises:
   a dispenser according to the first aspect of the invention, and
   a holder;
   wherein the holder is configured for i) holding the J-shaped or U-shaped mouthpiece in a stored position such that, in the stored position, the mouthpiece is aligned along the J-shaped or U-shaped curvature so that dentifrice dispensed through the outlet openings of the dispenser will engage the mouthpiece on locations distributed along curvature, and ii) to allow, after dentifrice has been dispensed onto the mouthpiece, withdrawal of said mouthpiece from the holder.

Such a system allows the user to place the U-/J-shaped mouthpiece in the holder when dentifrice is to be applied onto the mouthpiece. The user thus does not need to keep the mouthpieces with his hands in a correct position with respect to the plurality of outlets, but this is done by the holder. Not only is this easier in use, but it also ensures that the mouthpiece is always in correct position with respect to the (outlet openings of the) manifold when dispensing dentifrice onto it. Further, such a system also allows the U-/J-shaped mouthpiece to be stored in the holder after use, to be kept in the holder when not in use, and to be provided with dentifrice just before it is taken away from the manifold/holder and subsequently inserted into the mouth of a user for cleaning a plurality of dental positions. The holder may according to a further embodiment be configured such that the manifold engages the mouthpiece—for example bristles of the mouthpiece—when the mouthpiece is in the stored position, or alternatively such that the manifold is spaced from the mouthpiece (to avoid the manifold from directly contacting the mouthpiece) and has its outlet openings directed to the face of the mouthpiece which is configured for encompassing the dental positions.

C22: According to a further embodiment of the third aspect of the invention, the dental cleaner further comprises a handle on which the mouthpiece is mounted, and wherein the holder is a handle holder configured for receiving the handle such that the mouthpiece mounted on the handle is held in the stored position. This allows the dental cleaner to be stored together with its handle, whilst mounted onto its handle, in the storage station.

C23: According to another further embodiment of the third aspect of the invention, the dental cleaner comprises a rechargeable battery, and the storage station comprises a battery charger configured for charging contact with the battery when the mouthpiece is in the stored position. This allows the battery of the dental cleaner being charged when the mouthpiece is in the stored position. This ensures that the battery is always charged when the user needs the mouthpiece for cleaning his dental positions.

C24: According to another further embodiment of the third aspect of the invention, the storage station further comprises a cleaning device configured for cleaning the mouthpiece when the mouthpiece is in the stored position. The user may then store his mouthpiece after use without having it thoroughly cleaned in the storage station, and the mouthpiece will be cleaned by the storage station so as to have it available in a cleaned condition for a next use. After use the user may rinse his mouthpiece under the tap without worrying about thorough cleaning. It is also conceivable that the user does not have to rinse his mouthpiece under the tap and that the mouthpiece can be placed in the storage station directly after use. Such a cleaning device may for example be configured for treating the mouthpiece with a liquid and/or gas jet, and/or for decontaminating the mouthpiece. Decontaminating of the mouthpiece may for example comprise a sterilisation of the mouthpiece, and/or disinfecting the mouthpiece, and/or an antisepsis treating of the mouthpiece. Decontamination may for example make use of UV radiation.

C25: According to another further embodiment of the system having a said cleaning device, the cleaning device may according to the third aspect of the invention comprise:
   a cistern for a cleaning liquid, the outlet openings of the dispenser being arranged in the cistern, and the cistern being configured for receiving the mouthpiece in the stored position; and
   a cleaning liquid supply for supplying cleaning liquid into the cistern;
   wherein the cleaning device is configured for cleaning the mouthpiece with cleaning liquid supplied into the cistern.

The mouthpiece can be inserted into the cistern for a cleaning treatment. The cistern may for example have an open top side allowing insertion of the mouthpiece in the cistern, but it is also conceivable to have a cistern with a closable or sealable access opening for inserting the mouthpiece into the cistern and removing the mouthpiece from the cistern, which access opening is closed and optionally sealed during the cleaning treatment. During the cleaning treatment the cistern may for example be filled with a bath of cleaning liquid and/or the cistern may serve as enclosure preventing spillage of cleaning liquid, which may for example be injected with pressure, such as in the form of one or more jets. The cleaning liquid may be tap water and in an example the cleaning liquid supply comprises a hose which may be attached to a water tap. Cleaning liquid may be discharged from the cistern by emptying the cistern into the sink. According to a further embodiment a discharge tube may be attached to the cistern and in fluid communication with the inner space of the cistern. Such a discharge tube may for example comprise a discharge end which is free for discharge into a sink.

According to another further embodiment of a system having a cleaning device, the cleaning liquid supply may, according to the third aspect of the invention, comprise the dispenser duct work or at least part of the dispenser duct work for supplying cleaning liquid into the cistern through the outlet openings. When using the dispenser duct work for supplying cleaning liquid into the cistern, the dispenser duct work will be cleaned as well by the cleaning liquid passing through it. It is however also conceivable that the cleaning liquid supply comprises alternatively or in addition a cleaning liquid duct work separate from the dispenser duct work, which cleaning liquid duct work has its own outlets (i.e. outlets different from the multiple of outlet openings) debouching into the cistern.

C26-27: According to a further embodiment of the system having a said cleaning device with cistern, the cleaning device may according to a further embodiment of the third aspect of the invention further comprise a reservoir with cleaning liquid, the reservoir being operatively connected or connectable with the liquid supply for transferring cleaning liquid from the reservoir into the cistern. According to a further embodiment of this embodiment, the reservoir may be a replaceable cleaning cartridge. According to another further embodiment of this embodiment, a discharge tube in the form of a return pipe may connect the cistern and reservoir for discharging cleaning liquid from the cistern back to the reservoir. With such an embodiment with return pipe, the reservoir may according to a further embodiment be provided with a sieve in order to remove dirt particles from the cleaning liquid returned into the reservoir.

C28-29: In order to subject the mouthpiece in the cistern to a mechanical cleaning action assisting in removing dirt particles and debris from the mouthpiece, the liquid supply may, according to a further embodiment of the third aspect of the invention, be configured for introducing one or more pressurized jets of cleaning liquid into the cistern, the jets being directed onto the mouthpiece. In case of dental cleaner provided with a driving system configured for subjecting cleaning elements, such as bristles, to a to-and-fro movement, the cleaning device may alternatively or additionally be configured to bring the mouthpiece in the cistern in contact with the cleaning liquid and to operate the driving system to subject the brushing elements to the to-and-fro movement when the mouthpiece is in the stored position in the cistern in contact with cleaning liquid.

C30: According to another further embodiment of the third aspect of the invention, the system may further comprise a dose adjuster configured to adjust the dose of dentifrice to be dispensed in response to a user action or in response to a said mouthpiece arranged in the stored position. This may for example allow adjustment of the dose to take into account the size of a mouthpiece. Smaller mouthpieces may require a smaller dose than larger mouthpieces.

C31: According to a fourth aspect of the invention, the invention provides for a use of a dispenser according to the first aspect of the invention or a use of a system according to the third aspect of the invention for applying dentifrice simultaneously onto multiple locations on a J-shaped or U-shaped mouthpiece before inserting said mouthpiece into the mouth of a user, said mouthpiece being configured for simultaneously encompassing and treating a plurality of dental positions. The manifold is a component separate from the mouthpiece so that after dispensing dentifrice onto the mouthpiece, whilst the mouthpiece is outside the mouth of a user, the mouthpiece can be withdrawn from the manifold and subsequently inserted into the mouth of the user.

C32: According to a fifth aspect of the invention, the invention provides a method for applying dentifrice onto a J-shaped or U-shaped mouthpiece which is configured for simultaneously encompassing and treating a plurality of dental positions, wherein the method uses a dispenser according to one of the first aspect of the invention or a system according to the third aspect of the invention to apply the dentifrice simultaneously onto multiple locations on the mouthpiece. The manifold is a component separate from the mouthpiece so that after dispensing dentifrice onto the mouthpiece, whilst the mouthpiece is outside the mouth of a user, the mouthpiece can be withdrawn from the manifold and subsequently inserted into the mouth of the user.

BRIEF DESCRIPTION OF THE DRAWING

The invention will be explained further with reference to the drawings. In these drawings:

FIG. 1 shows schematically a dental arch.

FIG. 4 shows very schematically and in perspective view a first embodiment of a dentifrice dispenser according to the invention.

FIG. 5 shows very schematically and in perspective view a second embodiment of a dentifrice dispenser according to the invention. FIG. 5A very schematically shows the dentifrice dispenser itself, FIG. 5B shows very schematically that the outlet openings are arranged at opposite sides of a plane defined by the curvature.

DETAILED DESCRIPTION OF THE EMBODIMENTS

Figures 1A, 1B:
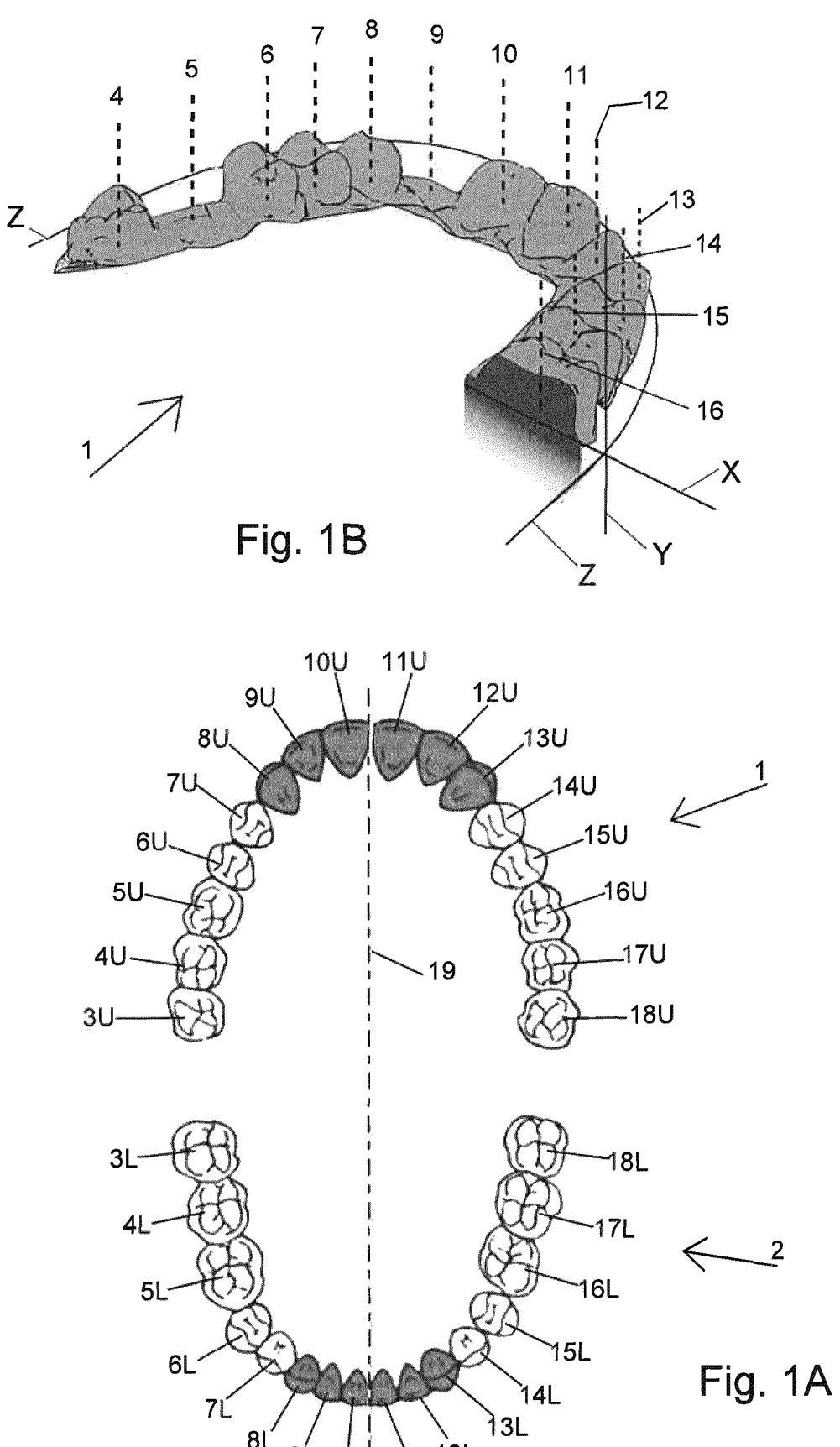
FIG. 1A shows in plan view the teeth of the lower dental arch and the teeth of the upper dental arch.
FIG. 1B shows an example of an upper dental arch with dental positions.

FIG. 1A shows in plan view, highly schematically an upper dental arch 1 and a lower dental arch 2. Each dental arch has in general 16 dental positions with a tooth which is named according to a nomenclature known to each dentist. Using this nomenclature, FIG. 1A shows:

the right upper third molar 3U and right lower third molar 3L, which are also called wisdom teeth;

the right upper second molar 4U and right lower second molar 4L;

the right upper first molar 5U and right lower first molar 5L;

the right upper second pre-molar 6U and right lower second pre-molar 6L;

the right upper first pre-molar 7U and right lower first pre-molar 7L;

the right upper canine 8U and right lower canine 8L;

the right upper lateral incisor 9U and right lower lateral incisor 9L;

the right upper central incisor 10U and right lower central incisor 10L;

the left upper central incisor 11U and left lower central incisor 11L;

the left upper lateral incisor 12U and left lower lateral incisor 12L;

the left upper canine 13U and left lower canine 13L;

the left upper first pre-molar 14U and left lower first pre-molar 14L;

the left upper second pre-molar 15U and left lower second pre-molar 15L;

the left upper first molar 16U and left lower first molar 16L;

the left upper second molar 17U and left lower second molar 17L; and the left upper third molar 18U and left lower third molar 18L, which are also called wisdom teeth.

Further, according to commonly used nomenclature, the canines 8U, 8L, 13U, 13L, lateral incisors 9U, 9L, 12U, 12L, and central incisors 10U, 10L, 11U, 11L are called the anterior teeth—shown in grey in FIG. 1A—, and all molars 3U, 3L, 4U, 4L, 5U, 5L, 16U, 16L, 17U, 17L, 18U, 18L and pre molars 6U, 6L, 7U, 7L, 14U, 14L, 15U, 15L are called the posterior teeth,—shown in white in FIG. 1A—.

FIG. 1B shows in perspective view, highly schematically a part of an upper dental arch 1 with dental positions 4-16. Each dental position is indicated with a vertical dashed line. Each dental position usually comprises an associated tooth which is named according to the above listed nomenclature. Dental position 7 is for example the dental position of the right upper first premolar 7U. In FIG. 1B the dental position of the left upper second molar is not shown, and also the dental positions of the wisdom teeth, the right and left upper third molars', are not shown.

FIG. 1B further shows a system of three mutually orthogonal axes, comprising an x-axis X, an y-axis Y and a z-axis Z. The z-axis Z is a curved axis following the contour of the dental arch 1, 2. The x-axis X and y-axis Y are perpendicular to each other and define an xy-plane which is essentially flat and perpendicular to the dental arch 1, 2, i.e. each xy-plane intersecting a location on the z-axis is, at that location, perpendicular to the curved z-axis Z. The z-axis Z defines a curved length direction. The z-axis Z and y-axis Y define a curved zy-plane, with viewed along the z-axis, an arc-shape similar to shape of the dental arc. Further, the z-axis Z and x-axis X define a zx-plane and the x-axis X and y-axis Y define an xy-plane.

Referring to the terms 'J-shaped or U-shaped length direction' and 'U-shaped cross-section' as used in this document, the 'J-shaped or U-shaped length direction' is associated to the U-shaped z-axis Z in FIG. 1B and the 'U-shaped cross-section' is associated with the xy-plane in FIG. 1B.

Figure 2:
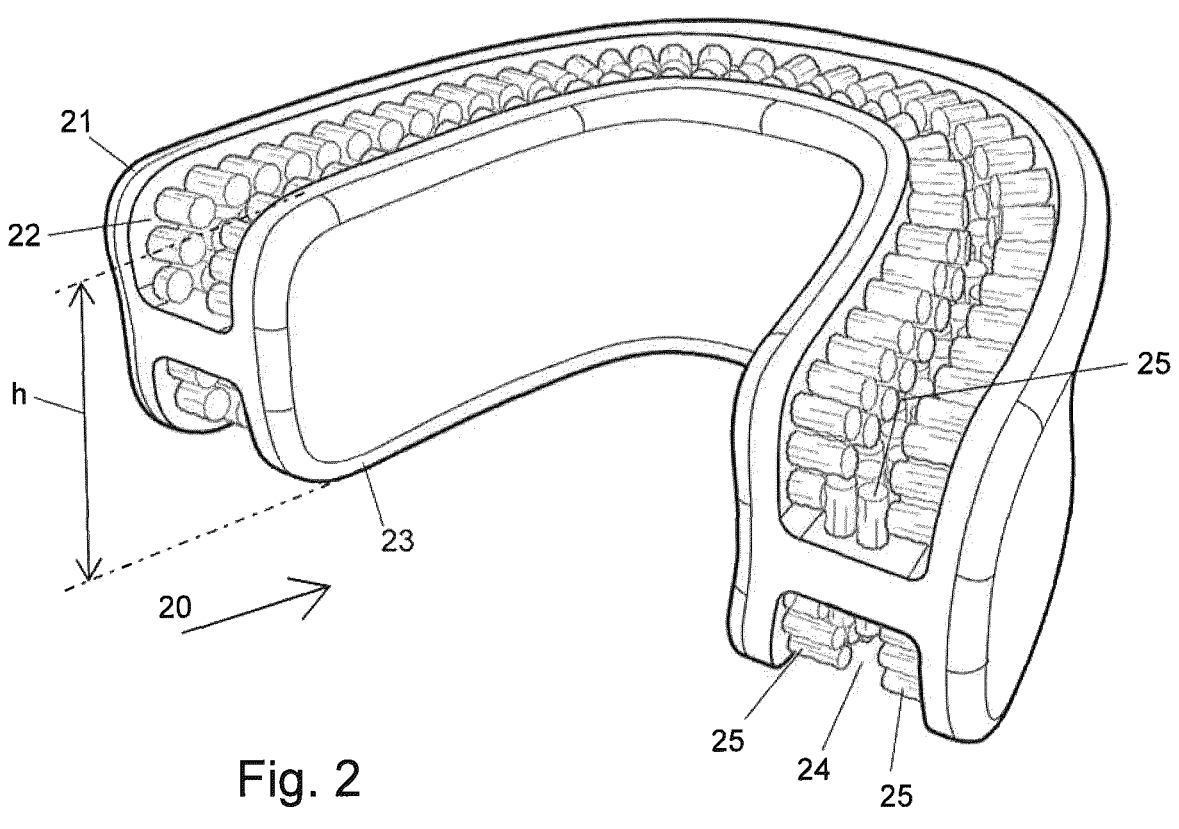
FIG. 2 show in perspective view an example of U-shaped mouthpiece.

FIG. 2 shows, in relation to the invention, schematically a perspective view of an example of an U-shaped mouthpiece 20.

The mouthpiece 20 of FIG. 2 has an upper part 21 or treating the upper dental arch 1 and a lower part 23 for treating the lower dental arch 2. The upper part 21 has an upper trough system 22, which has a U-shaped curved length axis, which is essentially parallel to the z-axis Z in FIG. 1. This upper trough system 22 with curved length axis is configured for simultaneously encompassing a plurality of dental positions (or teeth) of the upper dental arch 1. The lower part 23 has a lower trough system 24, which also has a U-shaped curved length axis, which is essentially parallel to the z-axis in FIG. 1. This lower trough system 24 with curved length axis is configured for simultaneously encompassing a plurality of dental positions (or teeth) of the lower dental arch 2. As shown in FIG. 2, the lower and upper trough system 21, 23 may each be formed as one continuous trough. Each trough system may however also comprise a multiple of trough sections aligned along the curved length axis of the trough system to provide a discontinuous trough system.

Each trough system 21, 23 is provided with brushing elements 25. These brushing elements may according to the invention be of any kind suitable for brushing the teeth. As shown in FIG. 2, these brushing elements are bristles, arranged in tufts 25 projecting from the wall of the trough into the trough. But also other brushing elements, like ribs or an embossed surface structure are very well conceivable within the scope of the invention as defined by the claims. It is however noted that the brushing elements may also be absent.

FIG. 2 shows in relation to the present invention a so called U-shaped full mouthpiece 20. In relation to the invention, the mouthpiece may however also be a so called U-shaped half mouthpiece (not shown). In a U-shaped half mouthpiece the upper part 21 of the mouthpiece 20 (or the lower part 23) is missing, and the remaining part can be used for treating subsequently the upper dental arch and lower dental arch by taking the mouthpiece out of the mouth after having treated one of the dental arches, turning it around a horizontal axis, and inserting it in the mouth again for treating the other dental arch.

Figure 3:
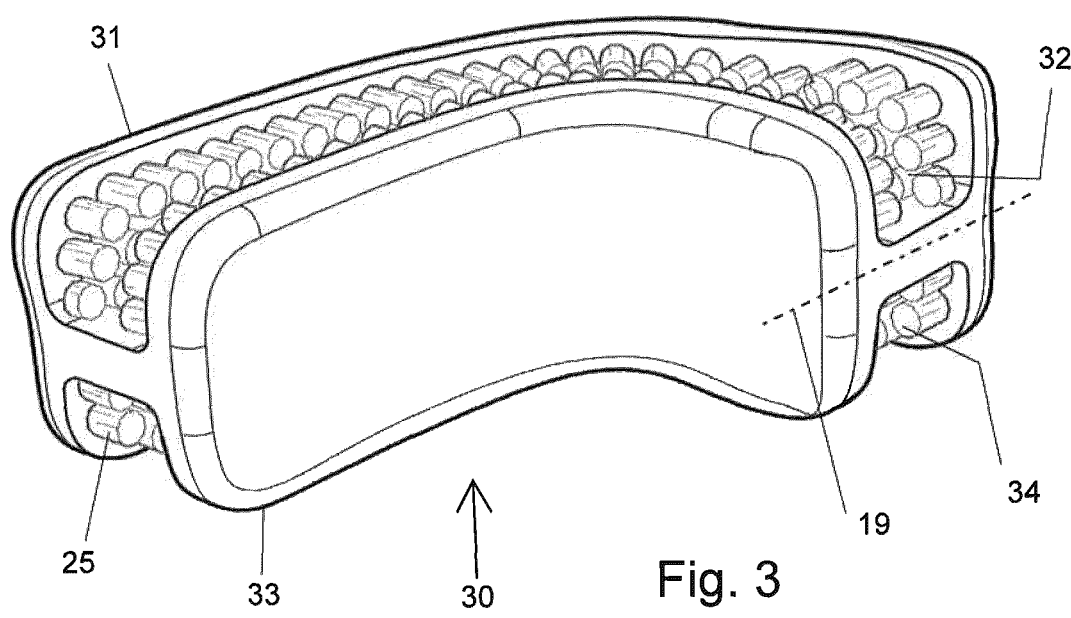
FIG. 3 show in perspective view an example of J-shaped mouthpiece.

FIG. 3 shows, in relation to the invention, a J-shaped mouthpiece 30. This J-shaped mouthpiece 30 is basically the same as the U-shaped mouthpiece 20 of FIG. 2, except that it is J-shaped instead of U-shaped. The J-shaped mouthpiece has an upper part 31 with an upper trough system 32 and a lower part 33 with a lower trough system 34. Similar as in FIG. 2, both trough systems 32 and 34 are provided with brushing elements 25. Similar as with FIG. 2, these brushing elements may also be absent.

The J-shaped mouthpiece shown is so called J-shaped full mouthpiece, which can simultaneously treat all dental positions on the right side of the upper and lower dental arch of a user or all dental positions on the left side of the upper and lower dental arch of a user. After having done one side (the right or the left), the user takes the mouthpiece out of his mouth, turns the mouthpiece 180 degrees around the centre axis 19—see also FIG. 1A—and places the mouthpiece back into the mouth for the other side (the left or the right). For cleaning action, a drive system (not shown) is provided. This drive system is configured to move the brushing elements or the walls of the upper trough system and lower trough system to-and-fro. In case brushing elements have been provided on the walls of the upper and lower trough system, these brushing elements will move to-and-fro as well when the walls of the trough system are moved to-and-fro. The drive system may be of any type known from the prior art. The drive system may for example comprise one or more pressure chambers arranged in or inside the upper part 21, 31 and lower part 23, 33 of the mouthpieces 20 respectively 30, which one or more pressure chambers are alternatingly pressurized and depressurized. Such drive systems have been described in detail in applicants earlier applications like WO-2018/199760, WO-2020/017963, and the not yet published NL patent applications NL-2025996, NL-2025997, and NL-2025996. But also other drive systems known from the prior art in relation to U-shaped and J-shaped toothbrushes may be used.

According to the first aspect, the invention provides a dentifrice dispenser for dispensing dentifrice onto a U-shaped mouthpiece, like the mouthpiece 20 of FIG. 2, or a J-shaped mouthpiece, like the mouthpiece 30 of FIG. 3.

FIG. 4 very schematically shows a first embodiment of a dentifrice dispenser 40 according to the invention. The dentifrice dispenser 40 comprises a dispenser duct work 41, 42, 43 having an inlet 41 and a U-shaped manifold 43 (shown in grey in FIG. 4). The manifold 43 comprises a multiple of outlet openings 44. The multiple of outlet openings 44 may be any number of outlet openings as from two or three outlet openings 44 to many outlet openings, like twenty five or even more. In the example of FIG. 4, nine outlet openings 44 are shown. These outlet openings are configured for dispensing dentifrice, as has been indicated schematically with 45. The dispenser duct work may optionally comprise an intermediate pipe 42 between the inlet 41 and manifold 43. The dispenser duct work 41, 42, 43 is configured for passing dentifrice from the inlet 41 to the multiple of outlet openings 44. The outlet openings 44 are arranged along a U-shaped curvature 46 and debouch towards the curvature 46. Due to being distributed along the U-shaped curvature 46 and debouching towards the curvature 46, the outlet openings 44 can dispense dentifrice simultaneously on a multiple of locations along the curvature 46. Doing so, the user only needs to place his mouthpiece along the manifold and the upper or lower trough system can—once dentifrice is supplied to the inlet 41 as indicated by arrow 47—be provided with dentifrice 45 in one go without any dispenser outlet being required to move along the mouthpiece for getting dentifrice distributed all over the mouthpiece. In case of a so called U-shaped half mouthpiece, one dispensing action will suffice with the dentifrice dispenser 40 of FIG. 4. In case of a so called U-shaped full mouthpiece 20 as shown in FIG. 2, two dispensing actions will suffice with the dispenser 40 of FIG. 4. In between the dispensing actions, the mouthpiece 20 and dentifrice dispenser 40 will be required to be flipped with respect to each other.

In this embodiment as well as other embodiments of a dentifrice dispenser for a U-shaped mouthpiece, the curvature matches at least the part of a dental arch extending from a left (upper or lower) molar to the right (upper or lower) molar. In a dentifrice dispenser for a U-shaped mouthpiece, the curvature may for example match the part of the dental arch which extends from the right first molar to the left first molar. In a dentifrice dispenser for a U-shaped mouthpiece, the curvature may according to another example match the part of the dental arch which extends from the right second molar to the left second molar.

Figures 5C, 6, 7:
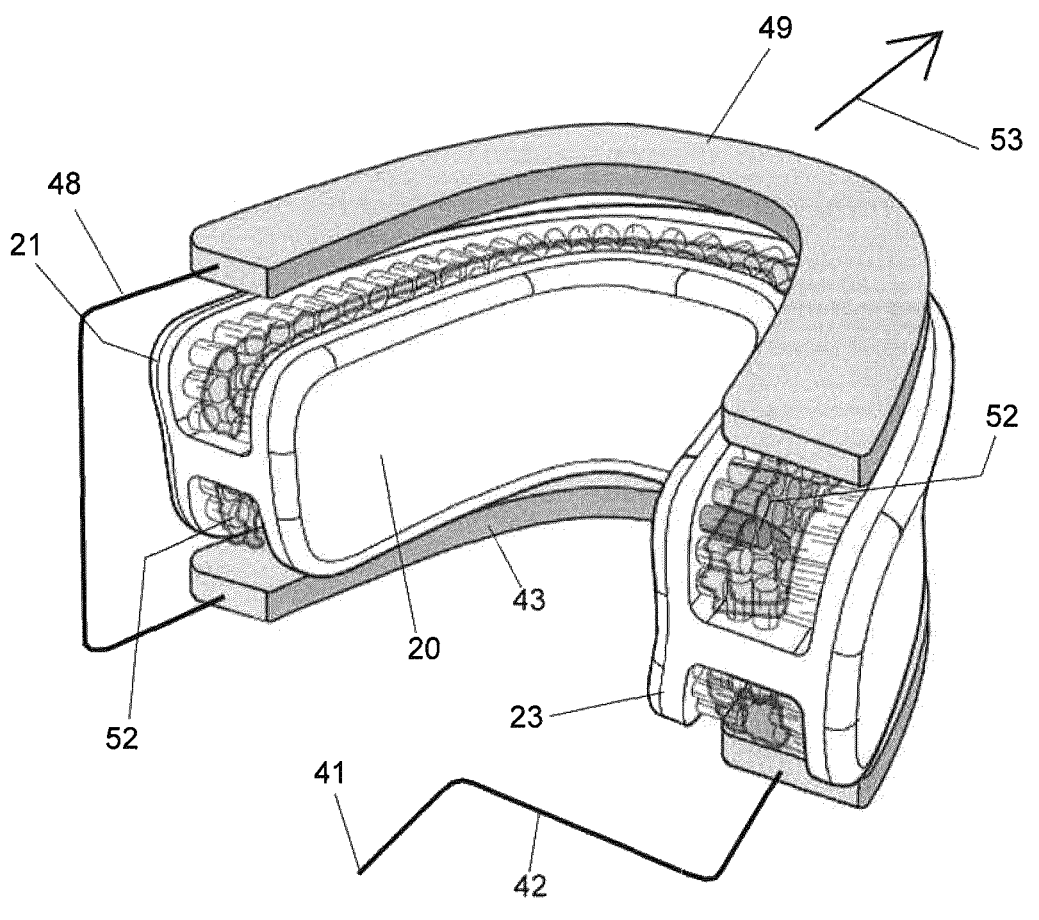
FIG. 5C shows very schematically the dentifrice dispenser of FIG. 5A together with a U-shaped mouthpiece.
FIGS. 6-10 show very schematically examples of possible configurations of the plurality of outlets and examples of the configurations of the manifold and manifold parts.

FIG. 5 very schematically shows a second embodiment of a dentifrice dispenser 50 according to the invention. FIG. 5A very schematically shows the dentifrice dispenser itself, FIG. 5B shows very schematically that the outlet openings are arranged at opposite sides of a plane defined by the curvature, and FIG. 5C shows very schematically a dentifrice dispenser like the one shown in FIG. 5A with a U-shaped mouthpiece, like for example the mouthpiece 20 of FIG. 2, arranged in the manifold of the dentifrice dispenser.

With the dentifrice dispenser 50 of FIG. 5, dentifrice can be dispensed in 'one go' onto a so called U-shaped full mouthpiece, like the mouthpiece 20 of FIG. 2. For this purpose, the manifold of the mouthpiece 50 has, so to say, been extended with a second manifold part 49 having a plurality of outlet openings 44 distributed along the curvature and debouching towards the curvature. The mouthpiece 50 has similar to the mouthpiece 40 a first manifold part 43 with a plurality of—for example nine—outlet openings 44. Dentifrice supplied—see arrow 47—to the inlet 41 is passed through an optional intermediate pipe 42 to the first manifold part 43. The second manifold part 49 is connected to the inlet 41 as well. As shown in FIG. 5A this may for example by the optional intermediate pipe 48, which connects the second manifold part 49 to the inlet via the first manifold part 43. Other manners of providing a fluid connection between the inlet 41 and the second manifold part 49 are however also conceivable. For example, the intermediate pipe 42 may be directly connected to the intermediate pipe 48, or the inlet 42 may be provided in the intermediate pipe 48, so that the intermediate pipe 48 serves as a divider, dividing the dentifrice supplied (arrow 47) to the inlet between the second manifold part 49 and first manifold part 43.

Referring to the schematic representation of FIG. 5B, the arrows indicate dentifrice flowing through the outlet openings 44. The outlet openings 44 of the second manifold part 49 are arranged above a plane 51 defined by the curvature 46, and the outlet openings 44 of the first manifold part 43 are arranged below this plane 51 defined by the curvature 46. The outlet openings 44 of the second manifold part 49 debouche towards the curvature 46 and also the outlet openings 44 of the first manifold part 43 debouche towards the curvature 46.

As can be seen in FIG. 5B, the outlet openings 44 are arranged in pairs mirrored with respect to the plane 51 defined by the curvature 46. The same applies for the outlet openings 44 shown in FIG. 5A. The outlet openings 44 being arranged in pairs mirrored with respect to the plane 51 is practical to obtain a similar distribution of dentifrice on both sides of a J-/U-shaped full mouthpiece, but the outlet openings may also be arranged in non-mirrored pairs or not in pairs at all.

FIG. 5B shows only three outlet openings 44 for the second manifold part 49 and three outlet openings 44 for the first manifold part 43. For a U-shaped mouthpiece three outlet openings per manifold part is about the minimum number of outlet openings. A better distribution of dentifrice is obtained with more outlet openings 44 per manifold part, such as four, five, six, seven, eight, nine or more outlet openings 44 per manifold part.

As indicated in FIG. 5A, the second manifold part 49 and first manifold part 43 are arranged at a distance H from each other. In order to allow insertion of a mouthpiece between the second manifold part 49 and first manifold part 43, this distance H will be about the same as or larger than the height h of the mouthpiece as is indicated in FIG. 2. A distance H larger than height h facilitates easy insertion.

FIG. 5C very schematically shows a mouthpiece, for example the mouthpiece 20 of FIG. 2, inserted between the second manifold part 49 and first manifold part 43. As shown indicated with reference 52 and slightly grey, dentifrice 52 has been applied onto the upper mouthpiece part 21 and lower mouthpiece part 23. In this example the dentifrice has been applied in the through system of the upper mouthpiece part 21 and in the through system of the lower mouthpiece part 23. The dentifrice may also lie more on top of the open side of the trough systems. After dentifrice has been dispensed onto the mouthpiece, the mouthpiece can be withdrawn from the manifold parts 43, 49 along the direction indicated by arrow 53. Also other manners of releasing the mouthpiece from the manifold are possible, for example, it is also possible to withdraw the manifold parts in a direction opposite the arrow 53, or to fold the manifold parts open by rotating the one with respect to the other, or to slide one of the manifold parts away with respect to the other and the mouthpiece, etcetera.

As visualized by way of example in FIG. 5C—but applicable to all other embodiments of the invention as well—, the dentifrice dispensed on and/or in the mouthpiece has been dispensed onto the face of the mouthpiece which is configured for encompassing the dental positions to be treated. This face is in this embodiment the inner wall face of the trough which is in length direction U-shaped or J-shaped and which has a at least partly a U-shaped and/or V-shaped cross-section, which U-shaped and/or V-shaped cross-section is transverse to the U-shaped/J-shaped length direction. As is further visualized in FIG. 5C—but applicable to all embodiments of the invention with bristles as well—, the outlets of the manifold may be configured to dispense the dentifrice on and/or in between the bristles provided in the trough.

FIGS. 6-10 show very schematically examples of possible configurations of the plurality of outlets and examples of the configurations of the manifold and manifold parts.

FIG. 6 shows very schematically a manifold of a dentifrice dispenser 60 for a J-shaped mouthpiece, for example the mouthpiece 30 of FIG. 3. Similar like the dispenser of FIG. 4, the manifold 63 of the dispenser 60 may be a manifold comprising one part manifold part for dispensing dentifrice onto one side of the J-shaped mouthpiece 30 at a time. However, similar like the dispenser of FIG. 5, the manifold 63 of the dispenser 60 may also be a first manifold part 63 of two cooperating manifold parts for dispensing dentifrice simultaneously at two opposite sides of a J-shaped mouthpiece 30. FIG. 6 shows only two outlet openings 44 for the manifold part 63. For a J-shaped mouthpiece two outlet openings per manifold part is about the minimum number of outlet openings. A better distribution of dentifrice is obtained with more outlet openings 44 per manifold part, such as three, four, five, six, seven, eight, nine or more outlet openings 44 per manifold part.

FIG. 7 shows very schematically as a variant of i) the dentifrice dispenser 40 of FIG. 4 and ii) the dentifrice dispenser 50 of FIG. 5, a manifold 43 respectively manifold part 43 having eleven outlet openings 44 per manifold part.

Figures 8, 9:
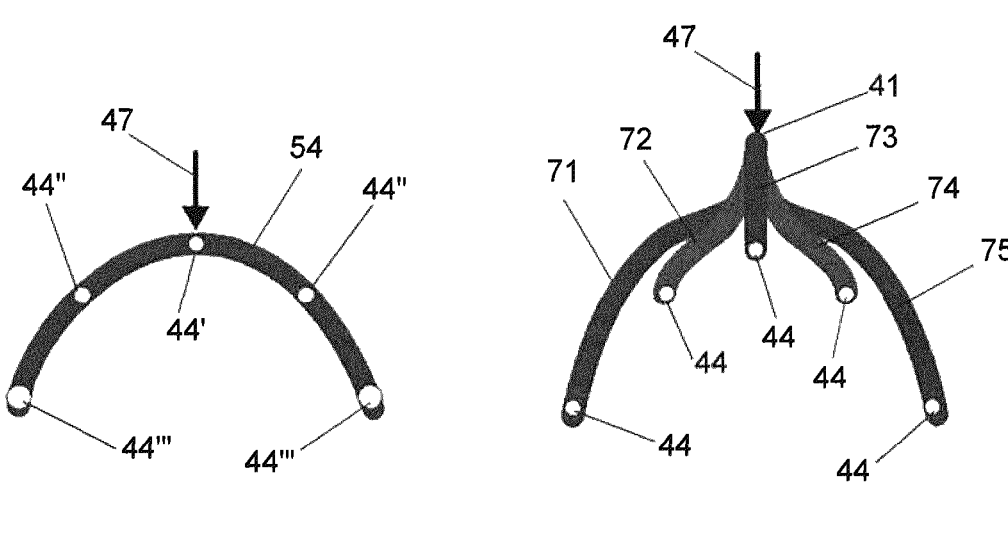

FIG. 8 shows very schematically how the multiple of outlet openings of a manifold 43 of FIG. 4 or manifold part 43, 49 of FIG. 5 can be serially fed with dentifrice. Dentifrice 47 supplied to the inlet 41 (not shown) is passed into a pipe 54, called serial pipe 54, having multiple outlets 44', 44", 44''' of a passage size which increase with respect to each other in the direction of passing of dentifrice through the seral pipe. Although this variant is shown in relation to a dentifrice dispenser for a U-shaped mouthpiece, it will be clear that this variant can also be applied to a dentifrice dispenser for a J-shaped mouthpiece.

FIG. 9 shows very schematically how the multiple of outlet openings of a manifold 43 of FIG. 4 or manifold part 43, 49 of FIG. 5 can be fed in parallel with dentifrice. Dentifrice 47 supplied to the inlet 41 is passed into a plurality of parallel pipes 71, 72, 73, 74, 75 each leading to an outlet 44 of the multiple of outlets. Although this variant is shown in relation to a dentifrice dispenser for a U-shaped mouthpiece, it will be clear that this variant can also be applied to a dentifrice dispenser for a J-shaped mouthpiece.

Figure 10:
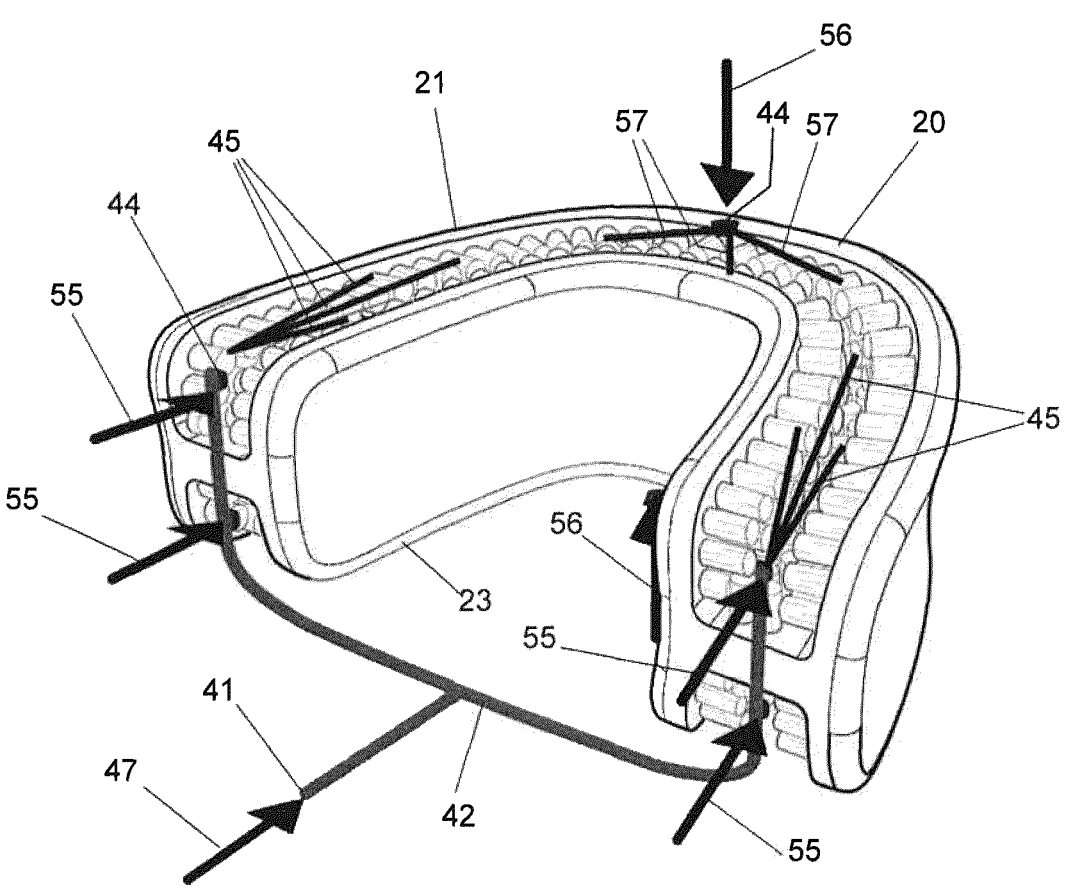

FIG. 10 shows very schematically how at least some of the multiple of outlet openings of a manifold 43 of FIG. 4 or manifold part 43, 49 of FIG. 5 can debouche along the curvature 46. In FIG. 10, arrow 47 indicates the supply of dentifrice into the inlet 41, and lines 45, 57 indicate the direction into which dispensed dentifrice distributes itself over and in the mouthpiece 20. Arrows 55 indicate dentifrice dispensed by outlets 44 debouching in a direction along the curvature 46 (not shown). In this example the outlets 44 indicated by arrows 55 debouche about parallel to the curvature. Arrows 56 indicate dentifrice dispensed by outlets 44 debouching towards the curvature 46. In this example the outlets 44 indicated by arrows 56 debouche about transverse to the curvature. The dentifrice dispensed by the outlets 44 indicated by arrows 56 distributes itself transverse to and along the curvature 46, as has been indicated by lines 57 in FIG. 10. Although this variant is shown in relation to a dentifrice dispenser for a U-shaped mouthpiece, it will be clear that this variant can also be applied to a dentifrice dispenser for a J-shaped mouthpiece. Further, although this variant is shown in relation to a U-shaped full mouthpiece, it will be clear that this variant can also be applied to a U-shaped half mouthpiece (or J-shaped half mouthpiece).

Figure 11:
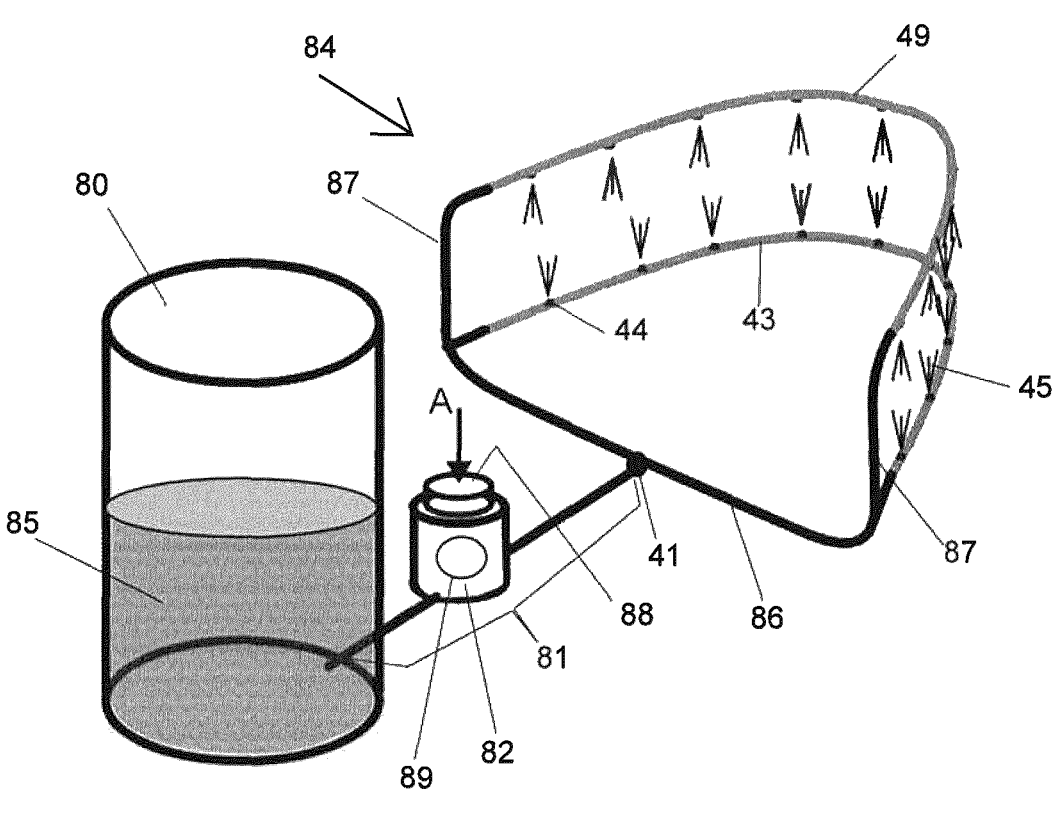
FIG. 11 shows very schematically and in perspective view a third embodiment of a dentifrice dispenser according to the invention.

FIG. 11 shows as further embodiment of a further extended dispenser according to the invention. The manifold 84 is basically the same as has been shown in FIG. 5A. The part of the duct work between the inlet 41 and the first manifold part 43 and second manifold part 49 is slightly different. It is however to be noted that this part of the duct work may also be identical to what has been shown in FIG. 5A or different from what has been shown in ether FIG. 11 or FIG. 5A.

In FIG. 11 the part of the duct work between the inlet 41 and the first and second manifold part comprises a first distribution pipe 86, distributing the dentifrice received at the inlet 41 to the left and right and two second distribution pipes 87, distributing the dentifrice received from pipe 86 over the first and second manifold parts 43, 49.

The embodiment of FIG. 11 further comprises, in addition to the earlier described embodiments, a dentifrice container 80 and a feed section 81 connecting the dentifrice container 80 with the inlet 41. The dentifrice container 80 contains dentifrice 85. According to a further embodiment, the dentifrice container may be a replaceable dentifrice cartridge.

As shown in FIG. 11, the feed section 81 may according to a further embodiment comprise an actuating mechanism 82. The actuating mechanism may comprise a control button 88 connected to a release mechanism 89 provided inside the actuating mechanism 82.

In case the container 80 is pressurized, the release mechanism 89 may simply be a valve which opens upon activation (arrow A) of the control button to allow pressurized dentifrice to pass. The valve may be configured to allow passing of dentifrice as long as it is kept open by activation of the control button, or may be configured to allow a predetermined or pre-chosen dose of dentifrice to pass upon each actuation of the control button.

In case the container is not pressurized, the release mechanism may comprise a pump or other pressurizing device configured for pressurizing an amount, such as a pre-determined dose, of dentifrice in order to supply it into the inlet 41 and to the outlets 44. The pump or other pressurizing device may be electrically driven or mechanically driven.

Figure 12:
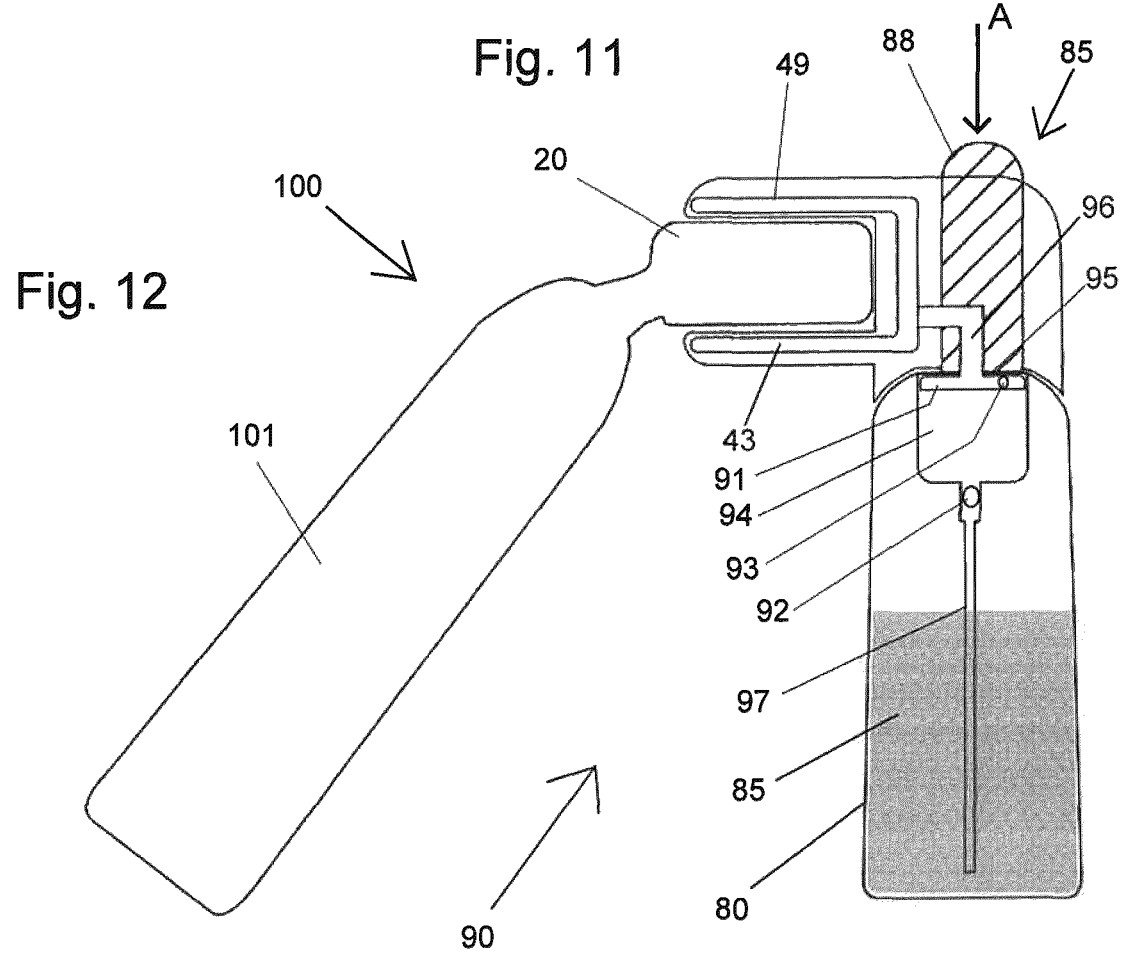
FIG. 12 shows very schematically and in side view a fourth embodiment of a dentifrice dispenser according to the invention.

FIG. 12 shows schematically an example of a realisation of what has been shown on very schematically in FIG. 11.

FIG. 12 shows a dentifrice dispenser 90 in the form of a handheld unit. The dispenser comprises a dentifrice container 80 with dentifrice 85. A dispenser head 85 is provided at the top of the container 80. The dispenser head 85 comprises:

a first or lower manifold part 43 which may be in correspondence with the first manifold part 43 of one of the preceding embodiments;

a second or upper manifold part 49 which may be in correspondence with the second manifold part 43 of one of the preceding embodiments;

a receiving bay defined between the lower manifold part 43 and upper manifold part 49 for receiving a U-shaped full mouthpiece, such as the mouthpiece 20 of FIG. 2;

a lower chamber 94;

an upper chamber 95;

a feed channel 96;

a piston 91 separating the lower chamber 94 and upper chamber 95 from each other and moveable to-and-fro in the vertical direction;

a suction tube 97 projecting from the lower chamber 94 into the container 80;

a one-way valve 92 arranged between the lower chamber 94 and suction tube 97 and configured to allow passage of fluid in upward direction and to prevent passage of fluid in downward direction;

a one-way valve 93 arranged and configured to allow passage of fluid from the upper chamber 95 to the lower chamber 94 and to prevent passage of fluid from the lower chamber 94 to the upper chamber 95; and a control knob 88 moveable downwards against the force of a return spring (not shown) and movable upwards by the return spring (not shown) and attached to the piston 91 to move the piston 91 as a result of movement of the control knob.

Pushing the control knob 85 downwards in the direction of arrow A, causes the plunger 91 to move downwards.

When the plunger 91 moves downwards, fluid present in the lower chamber 94 is pressurized because to the one-way valve 92 prevents the fluid in the lower camber 94 from escaping. The fluid in the lower chamber 94 is allowed to pass to the upper chamber 95 through the one-way valve 93 which opens as a result of the pressure built up in the lower chamber 94. When the plunger 91 has reached its lower most point, the upper chamber 95 is filled with one dose of dentifrice which has been passed from the lower chamber 94 to the upper chamber 95. After releasing the control knob 88, the return spring (not shown) will return the knob 88 and plunger 91 to their upper most position. This results in an under pressure in the lower chamber 94 which opens the one-way-valve 92 and allows dentifrice 85 to be suctioned into the lower chamber 94 through the suction tube 97. This will refill the lower chamber 94 with dentifrice, so that the dentifrice dispenser 90 is ready for a next dispensing action. Returning the control knob and plunger to the upper most position shown in FIG. 12 by the return spring, will also result in pressurizing the dentifrice in the upper chamber 95 so that it is forced into feed channel 96 and into the upper manifold part 49 and lower manifold part 43 for being dispensed through the outlets 44 onto and/or into the mouthpiece 20 arranged in the receiving bay. Then the user can withdraw the mouthpiece from the receiving bay and start cleaning a plurality of dental positions with the mouthpiece.

An actuation mechanism for controlling the transfer of a fluid from the container to the inlet as described above in relation to FIG. 12 is not known in relation to dentifrice, but is as such known in relation to fluids like soap. It is also known that there are many variants of such actuation mechanisms, which may be used for a dentifrice dispenser according to the invention as well. It is for example conceivable to configure the mechanism such that the lower chamber becomes the chamber that feeds pressurized dentifrice into the feed channel and such that the upper chamber is the chamber that suctions dentifrice from the container. This can be realized by connecting the lower chamber with the feed channel 96 and connecting the upper chamber with the suction duct 97 via the one-way-valve 92, and by reversing the one-way-valve 93. Then the pushing action on the control knob will cause the dispensing instead of the return movement of the control knob. In another variant it is conceivable to promote foaming of the dentifrice by adding air to the dentifrice in the chamber connected to the feed channel. According to another variant, the upper manifold part 49 and/or lower manifold part 43 may be configured to move with respect to each other when the control knob moves upwards or downwards. This allows for example the bay being wide for easy insertion of the mouthpiece and becoming or being smaller during dispensing of the dentifrice.

As shown in FIG. 12, the mouthpiece 20 is mounted on a handle 101 to form together with the handle 101 a dental cleaner 100, such as a toothbrush.

Figure 13:
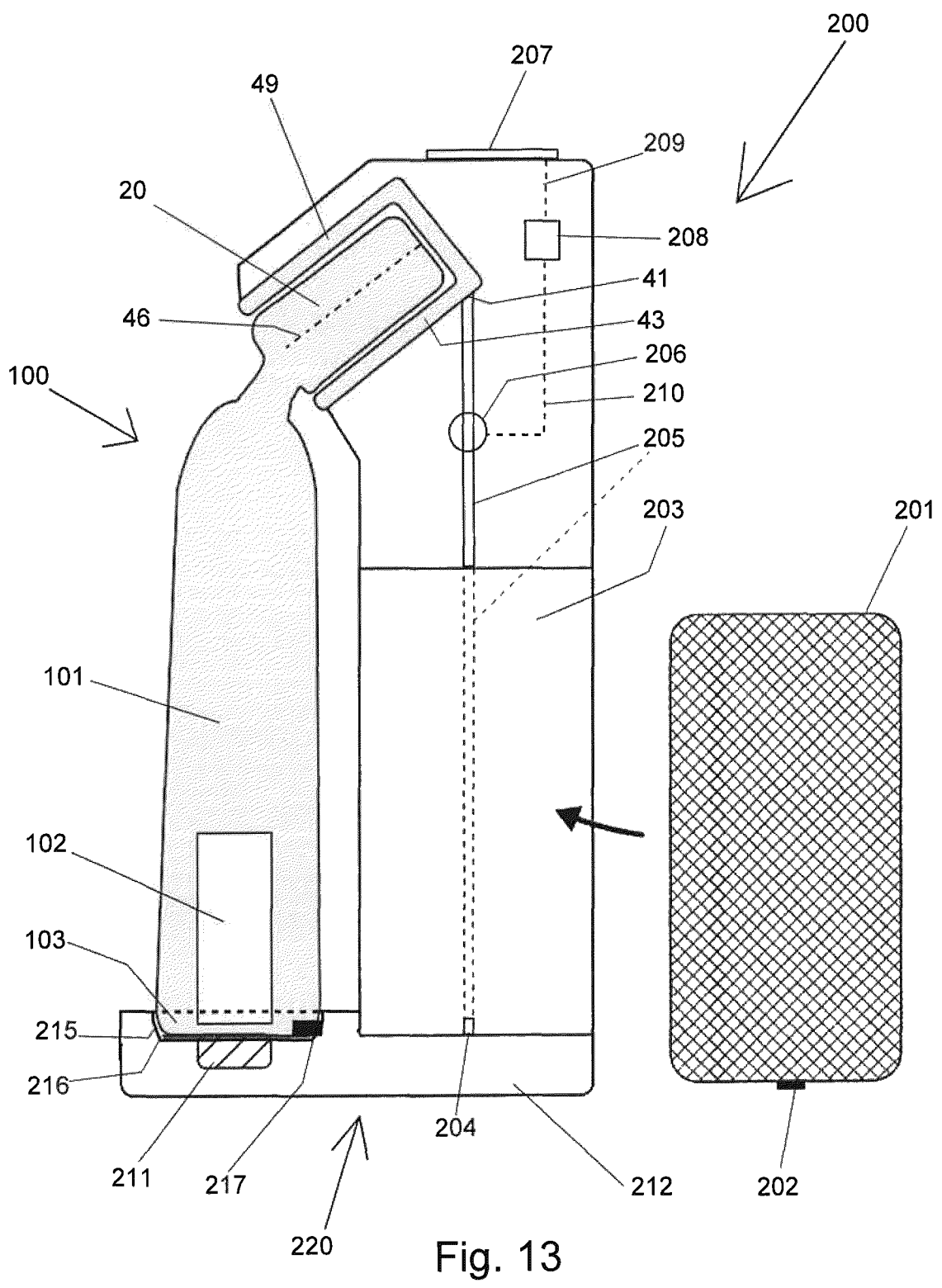
FIG. 13 shows very schematically and in side view a first embodiment of a system according to the invention.

FIG. 13 schematically shows as an example a first embodiment of a system 200 according to the invention. The system 200 comprises:

a dental cleaner 100 having a U-shaped mouthpiece, such as the mouthpiece 20 of FIG. 2; and a storage station 220 to store at least the mouthpiece 20 or more complete the dental cleaner 100 when not used for cleaning teeth.

The storage station comprises a dentifrice dispenser according to the first aspect of the invention, and a holder 215. In this embodiment, the holder 215 is by way of example a recess 216 in the base 212 of the storage station 220. The holder 215 is configured such that, when the dental cleaner 100 is in a stored position stored in the storage station 220, the mouthpiece 20 is aligned along the curvature 46 so that, when dentifrice is dispensed from the outlet openings 44 (not visible in FIG. 13) of the first manifold part 43 and second manifold part 49 onto and/or into the mouthpiece 20, the dentifrice dispensed engages the mouthpiece on locations which are distributed along the curvature and associated to the respective outlet openings 44. In this example of FIG. 13, the recess 216 is a handle holder receiving the free end 103 of the handle 102 in a unique form closing manner. This receiving in unique form closing manner ensures that the free end 103 can only be received in the recess 216 in one single pre-determined manner, which in turn ensures that the mouthpiece is aligned along the curvature 46. A receiving in a unique form closing manner may for example be achieved when the free end 103 has a radial slit into which a projection 217 projecting from the base 212 is received.

According to a further embodiment of the system 200, the dental cleaner 100 may comprise a rechargeable battery 102 and the storage station 220 may comprise a battery charger 211 configured to charge the battery 102 when the dental cleaner is stored in the storage station.

The dentifrice dispenser according to the first aspect of the invention is integrated in the storage station. The dentifrice container is in this example a replaceable cartridge 201 with a spout 202 for receiving an end 204 of the feed section 205, which extends from the base 212 to the inlet 41.

In the embodiment of FIG. 13, the feed section 205 comprises by way of example an electrical pump 206 for pumping dentifrice from the cartridge 201 in pressurized condition into the inlet 41 of the duct work of the manifold. This electrical pump may be controlled by a controller 208 connected via 210 with the pump 206. The controller receives its input from a user interface, which is by way of example a touch screen 207 which is via 209 connected with the controller. The touch screen 207 has a control button in the form of a touch sensor sensing contact of a finger of a user. The touch screen may also be configured for receiving additional input about the dose of dentifrice to be dispensed or about the size or type of mouthpiece. This additional input may be used by the controller 208 for operating the pump, depending from the dose of dentifrice to be dispensed, for a longer or shorter time and/or with a lower or higher pressure.

Figure 14:
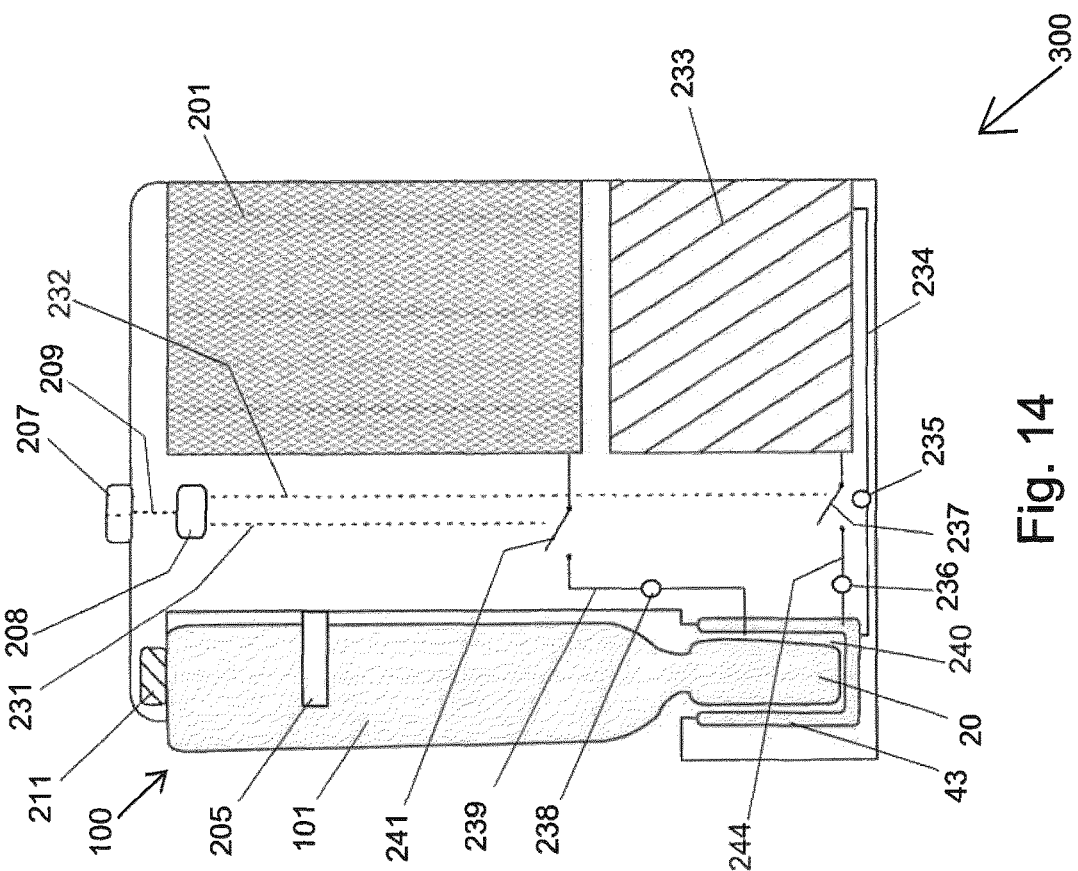
FIG. 14 shows very schematically and in side view a second embodiment of a system according to the invention.

FIG. 14 schematically shows as an example a second embodiment of a system 300 according to the invention. In addition to the system 200 of FIG. 13, the system 300 is additionally provided with a cleaning device comprising:

replaceable cartridge 233 with cleaning liquid for cleaning the mouthpiece 20 after use;

a cistern 240; and a cleaning liquid supply 244 for supplying cleaning liquid to the cistern 240.

In the embodiment of FIG. 14, the holder 205 is a clamp embracing the handle 101 of the dental cleaner 100 such that the mouthpiece is kept in the cistern aligned with the curvature (not shown).

In the system 300, the cleaning liquid supply 244 from the cleaning liquid cartridge 233 to the cistern 240 is separate from the supply of dentifrice to the manifold. The cleaning liquid supply comprises a valve, which can be operated between open and closed state under control of the controller 208 which is connected via 232 with the valve 237. The cleaning liquid supply further comprises an electrical pump 236 operated by the controller 208. When the controller 208 brings the valve in its open state, the pump 236 is also operated to pump cleaning liquid into the cistern. The cleaning liquid may be injected into the cistern as jets directed to the mouthpiece 20 to subject the mouthpiece to a jet cleaning action, also called a mechanical cleaning action, due to the jets impinging on the mouthpiece. In addition or alternatively, the cistern may be filled with cleaning liquid and mechanical cleaning action may be induced by operating the drive system of the cleaning elements of the mouthpiece to cause parts of the mouthpiece to vibrate. During the cleaning of the mouthpiece and/or after the cleaning of the mouthpiece, cleaning liquid can be discharged from the cistern 240 back to the cleaning liquid reservoir by means of the return pipe 234 provided with a pump 235 operated by the controller 208.

The system 300 allows the mouthpiece to be thoroughly cleaned after use so that it is, in clean condition, made available for a next use. When the user wishes to use the mouthpiece for a next use, he will operate the user interface 207 for a dispensing action before he removes the mouthpiece from the cistern. Operating the user interface 207 for dispensing will initiate the controller:

to bring the valve 237 in a closed state, if not already in closed state, to empty the cistern by operating the pump 235, if the cistern is not already empty from cleaning liquid, and will subsequently bring the valve 241 in an open state and operate the pump 239 to transfer dentifrice from the dentifrice cartridge 201 to the manifold for dispensing it through the multiple of outlets onto or into the mouthpiece.

After completion of the dispensing action, the user may remove the mouthpiece from the cistern for cleaning his teeth.

Figure 15:
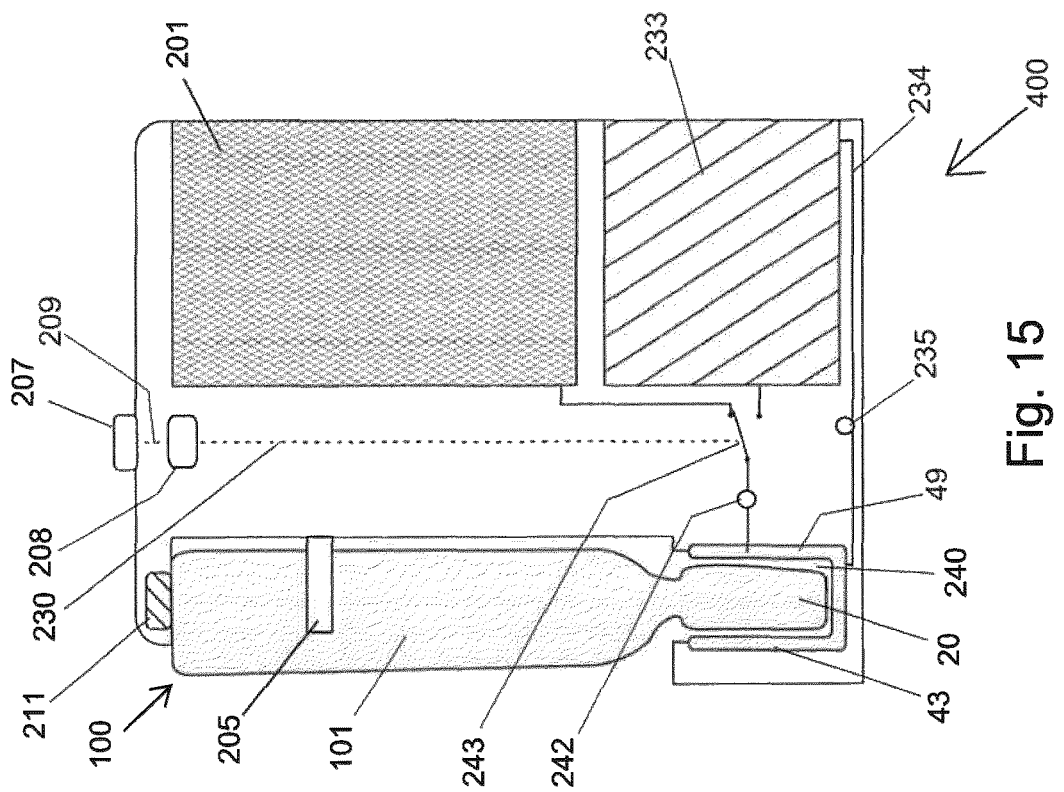
FIG. 15 shows very schematically and in side view a second embodiment of a system according to the invention.

FIG. 15 schematically shows as an example a third embodiment of a system 400 according to the invention. The system 400 of FIG. 15 and the system 300 of FIG. 14, basically differ in that in the system 400 the supply of cleaning liquid to the cistern is not separated from the supply of dentifrice to the multiple of outlets. In fact the supply of cleaning liquid makes use of the manifold and its multiple of outlets for dispensing dentifrice. When cleaning the mouthpiece after use, the cleaning liquid is passed through the manifold and its multiple of outlets into the cistern. Doing so also remnants of dentifrice are removed from the duct work, which may prevent the duct work from becoming dirty or clogged. In order to realize this, a switch valve 243 switching between a first state and second state may be used, the first state connecting the duct work with the dentifrice cartridge 201 and the second state connecting the duct work with the cleaning liquid cartridge. The controller 208 is further configured to operate the pump 242 to dispense a dose of dentifrice when the switch valve 243 is in the first state and to feed cleaning liquid into the cistern when the valve 243 is in the second state.

Figure 16A:
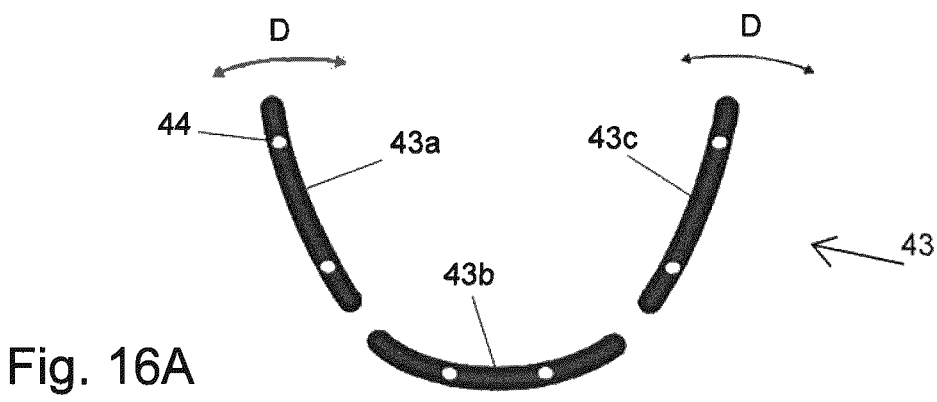
FIG. 16A showing a top view, FIG. 16B showing, in transverse cross-section, an initial condition before adjustment, and FIG. 16C showing, in cross-section similar to the one of FIG. 16B, an adjusted condition after adjustment.

FIG. 16A shows very schematically an example of a manifold part 43 having a plurality of manifold sub-parts 43a, 43b, 43c. Each of these manifold sub-parts may have one or more outlet openings 44. In the example shown in FIG. 16A, there are three manifold sub-parts and each manifold sub-part has two outlet openings. It will however be understood that the manifold part 43 may comprise more or less manifold sub-parts as well and that each manifold sub-part may comprise more or less outlet openings as well. The manifold part 43 is configured such that the U-shaped curvature—along which the outlet openings 44 are arranged—of the manifold is adjustable or adjusts itself to the U-shaped mouthpiece. As indicated by the arrows D, the manifold sub-parts of the manifold part are, for this purpose, moveable with respect to each other in a plane parallel to the plane defined by the U-shaped curvature. This movability of the manifold sub-parts may for example be independent from each other. In case of a first manifold part 43 and a second manifold part 49, the second manifold part may be configured identical or similar to the first manifold part. The second manifold part 49 may for example have a number of manifold sub-parts which differs from the number of manifold sub-parts of the first manifold part 43 and/or the number of outlet openings of the manifold sub-parts of the second manifold part 49 may differ from the number of outlet openings of the manifold sub-parts of the second manifold part 43.

Figure 16B:
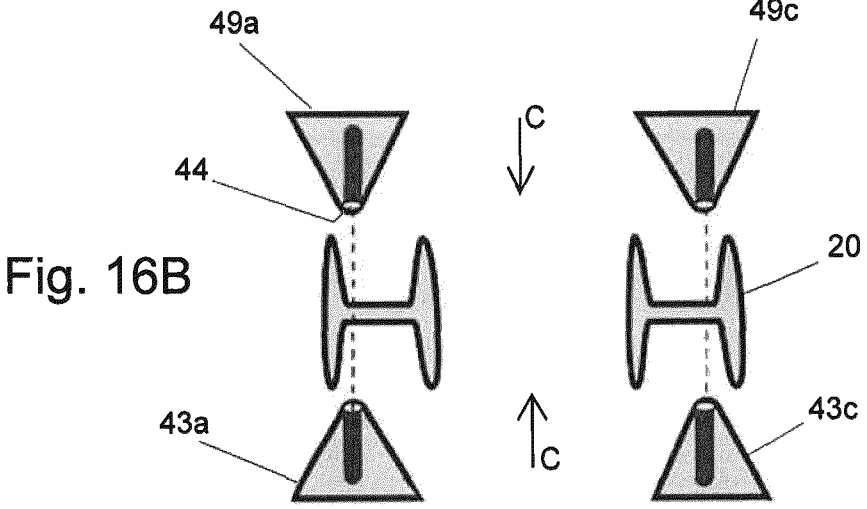
FIG. 16 shows very schematically an embodiment of the manifold allowing adjustment of the U-shaped curvature to the U-shaped mouthpiece.
Figure 16C:
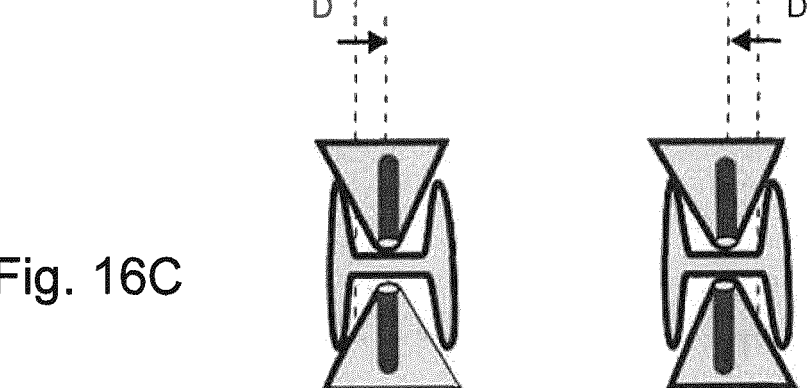

FIGS. 16B and 16C show by way of example how— according to a further embodiment of what has been described above—the manifold sub-parts can be moved with respect to each other to adjust the U-shaped curvature along which the outlet openings 44 are arranged.

FIGS. 16B and 16C show a U-shaped full mouthpiece 20 having—see FIG. 16B—a shape not in conformity with the U-shaped curvature along which the outlet openings are arranged. The manifold subparts of the first manifold 43 and second manifold 49 are tapered towards the mouthpiece 20. When moving the mouthpiece sub-parts according to arrow C relative to the mouthpiece 20, the taper of the manifold sub-parts will engage the side walls of the trough of the mouthpiece and will subsequently be guided in a direction (arrows D) parallel to the plane of the curvature along which the outlet openings are arranged to arrive in a position aligned with respect to the trough of the mouthpiece—see FIG. 16C. The direction of the arrow D will depend from the misalignment in the initial condition of FIG. 16B.

FIG. 17 shows schematically a manifold 510 which is configured to adjust the U-shaped mouthpiece to the U-shaped curvature along which the outlet openings 44 of the manifold 43 or manifold part 43 and manifold part 49 are arranged. This adjustment can according to a further embodiment be achieved with a manifold comprising a W-shaped receiving dock 511.

Figures 17A, 18A, 18B:
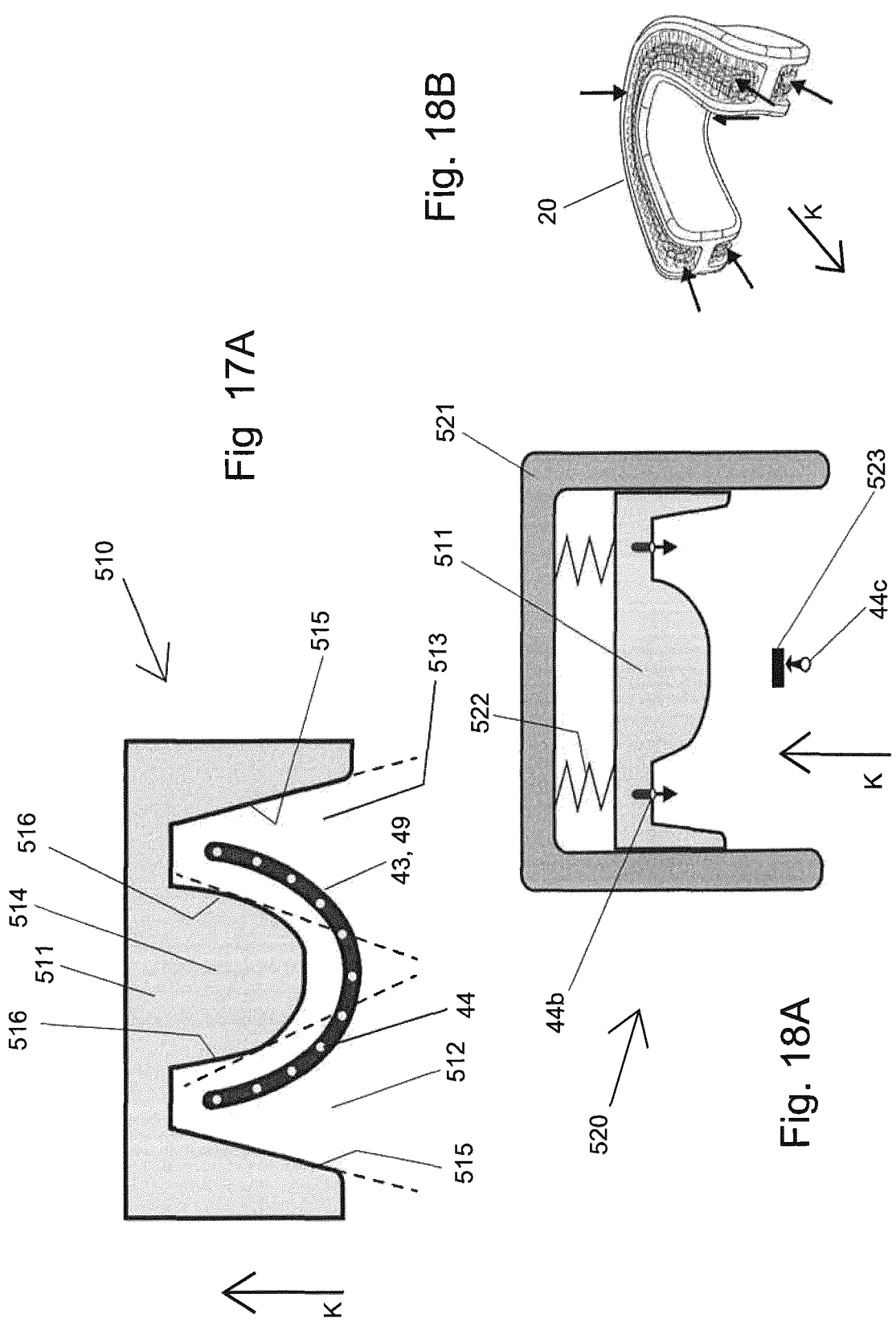
FIG. 17 shows very schematically an embodiment of the manifold allowing adjustment of the U-shaped mouthpiece to the U-shaped curvature, FIG. 17A showing the manifold in top view, FIG. 17B showing the same view as FIG. 17A with a small mouthpiece, FIG. 17C showing the same view as FIG. 17A with a medium mouthpiece, and FIG. 17D showing the same view as FIG. 17A with a large mouthpiece.
FIG. 18 shows very schematically a further embodiment of the manifold of FIG. 17, FIG. 18A showing the manifold in top view, and FIG. 18B indicating the direction in which the outlet openings shown in FIG. 18A debouch.

Referring to FIG. 17A, the W-shaped receiving dock 510 has two adjacent reception bays 512, 513 with a central member 514 arranged in between. Each receiving bay has an outer side wall 515 and an inner side wall 516 defined by the central member 514. Viewed in the insertion direction K, the central member 514 widens, or said differently, viewed in the direction opposite to the insertion direction, the inner side walls 516 taper with respect to each other. Further, viewed in the insertion direction the taper with respect to each other. The manifold 510 further comprises a first manifold part 43 and second manifold part 49. In the view of FIG. 17A, the first manifold part 43 lies above and overlaps the second manifold part 49.

Figures 17B, 17C, 17D:
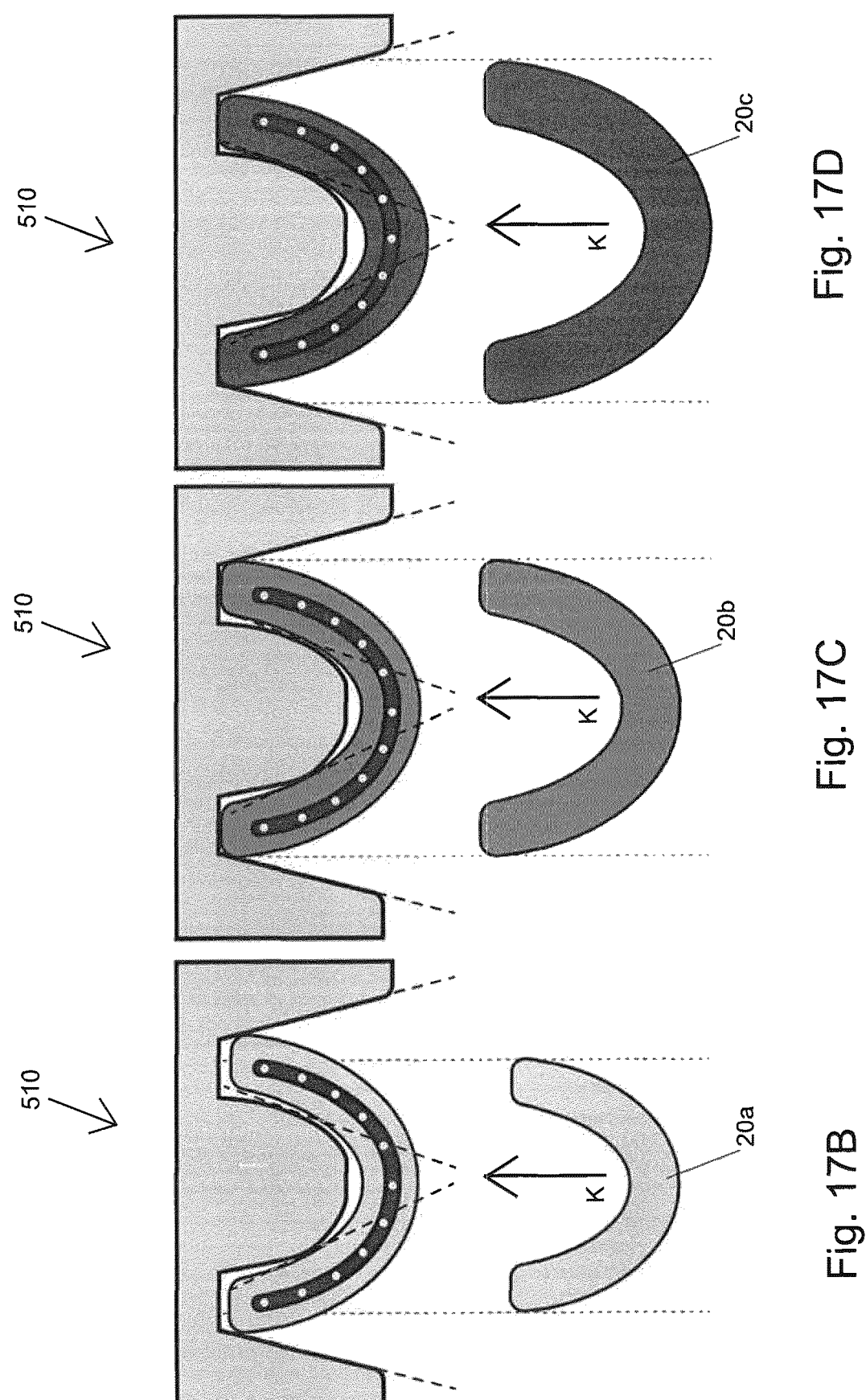

Referring to FIGS. 17B, it is shown schematically how a relative small mouthpiece 20a is widened by the W-shaped receiving dock when the legs of the mouthpiece 20a are inserted, in the insertion direction K, into the W-shaped receiving dock 510. The inner sides of the legs of the mouthpiece 20a will contact the inner side walls 516, causing the legs of the mouthpiece 20a to spread.

Referring to FIGS. 17C, it is shown schematically how a medium mouthpiece 20b is received by the W-shaped receiving dock without any deformation of the mouthpiece. In case the legs of the mouthpiece 20b might not be correctly aligned with respect to the W-shaped receiving dock, the outer side walls 515 and inner side walls 516 will effect correction of the misalignment when the legs of the mouthpiece 20b are inserted, in the direction of arrow K, into the receiving bays 512, 513. Such a correction of misalignment will also be effected in case the relative small mouthpiece 20a is misaligned when inserted. Similar applies for the relatively large mouthpiece of FIG. 17D.

Referring to FIGS. 17D, it is shown schematically how a relative large mouthpiece 20c is made smaller by the W-shaped receiving dock when the legs of the mouthpiece 20c are inserted, in the insertion direction K, into the W-shaped receiving dock 510. The outer sides of the legs of the mouthpiece 20c will contact the outer side walls 515, causing the legs of the mouthpiece 20c to be squeezed.

FIG. 18A shows as a further variant of FIG. 17, how the manifold can adjust in order to deal with mouthpieces having, viewed in the insertion direction K, legs of a different length. For this purpose the W-shaped receiving dock 511 is configured to be movable in the insertion direction K. This movability of the receiving dock 511 may for example be counteracted by one or more springs 522 which serve as return spring returning the receiving dock to its initial position in a direction opposite to arrow K after removal of the mouthpiece. As indicated in FIG. 18A, the bottom of each receiving bay 512, 513 may be provided with an outlet opening 44b debouching in a direction opposite to arrow K. This is further illustrated by the four arrows in FIG. 18B, which point towards the free ends of the legs of the mouthpiece. The manifold 520 may additionally also comprise a stop 523 configured to engage the mouthpiece and prevent the mouthpiece from further insertion such that the central outlet opening 44c is aligned with the incisor part of the mouthpiece. Optionally, additional outlet openings (not shown) may be arranged, along a fixed curvature or adjustable curvature, between the central outlet opening(s) 44c and the outlet openings 44b.

An embodiment like described with reference to FIG. 17 or FIG. 18 may be combined with an embodiment like described with reference to FIG. 16.

Embodiments of the invention may also be described as worded in one or more of the following clauses:

1] Dentifrice dispenser for dispensing a dentifrice onto a J-shaped or U-shaped mouthpiece configured for simultaneously encompassing and cleaning a plurality of dental positions with the dispensed dentifrice and with cleaning elements provided on or in the mouthpiece;

wherein the dispenser comprises a dispenser duct work having an inlet and a manifold;

wherein the manifold comprises a multiple of outlet openings configured for dispensing dentifrice;

wherein the dispenser duct work is configured for passing dentifrice from the inlet to the multiple of outlet openings; and wherein the outlet openings are distributed along a J-shaped or U-shaped curvature and debouch towards and/or along the curvature, the curvature matching at least part of a dental arch comprising a molar, pre-molars, a canine, and incisors—such as a lateral incisor and central incisors—such that the outlet openings can dispense dentifrice simultaneously on a multiple of locations along the curvature, the multiple of locations corresponding to the multiple of outlet openings.

2] Dispenser according to clause 1, wherein the outlet openings are arranged at opposite sides of a plane defined by the curvature.

3] Dispenser according to clause 2, wherein the outlet openings are arranged in pairs mirrored with respect to the plane defined by the curvature.

4] Dispenser according to one of the preceding clauses, wherein the curvature is U-shaped.

5] Dispenser according to clause 4, wherein the manifold is configured to adjust:
the U-shaped curvature to the U-shaped mouthpiece, and/or
the U-shaped mouthpiece to the U-shaped curvature.

6] Dispenser according to clause 5, wherein the multiple of outlet openings have a mutual positioning, wherein the manifold is configured to adjust the mutual positioning of the multiple of outlet openings to conform the U-shaped curvature to the U-shaped mouthpiece.

7] Dispenser according to one of the clauses 4-6,
wherein the mouthpiece is a U-shaped mouthpiece having two leg parts connected by a central part;
wherein the manifold comprises a W-shaped receiving dock having two adjacent reception bays separated by a central member;
wherein the dock is configured to receive the leg parts of the U-shaped mouthpiece in the reception bays when the leg parts of the mouthpiece are inserted in an insertion direction into the reception bays;
wherein each receiving bay has an outer side wall and an inner side wall, the inner side walls being defined by the central member;
wherein, viewed in the insertion direction, the central member widens; and
wherein, viewed in the insertion direction, the outer side walls taper with respect to each other.

8] Dispenser according to one of the preceding clauses, further comprising a container for dentifrice and a feed section connecting the dentifrice container with the inlet for transfer of dentifrice from the dentifrice container to the inlet.

9] Dispenser according to clause 8, further comprising an actuation mechanism configured for controlling the transfer of dentifrice, through the feed section, from the container into the inlet 10] Dispenser according to clause 9, wherein the actuation mechanism is further configured to pressurize the dentifrice to be passed through the duct work.

11] Dispenser according to one of the clauses 8-10, wherein the container is a replaceable dentifrice cartridge.

12] Dispenser according to one of the clauses 8-11, wherein the container comprises dentifrice.

13] Dispenser according to clause 12, wherein the dentifrice comprises one or more of:
a fluoride;
0.1-0.15 gram, such as 0.1125-0.1275 gram or about 0.125 gram, of an abrasive per dose of dentifrice, in which the abrasive may comprise one or more of aluminum hydroxide, calcium hydrogen phosphates, calcium carbonate, silica and hydroxyapatite or a combination comprising one or more of these;
15-80% of weight, such as 20-40% of weight or 45-70% of weight, of water.

14] Dispenser according to one of the clauses 8-13, wherein the container is dimensioned for containing a multiple of doses of dentifrice—such as 20 to 150 doses of dentifrice—, and wherein the actuation mechanism is configured to transfer one predetermined dose of dentifrice upon actuation of the actuating mechanism.

15] Dispenser according to clause 14, wherein the container is configured for dispensing a predetermined dose or a dose determined by a controller on the basis of input received from a sensor or user interface.

16] Dispenser according to clause 14 or 15, wherein one dose comprises 0.2 to 1.25 mg of fluoride, such as 0.20 to 0.40 mg of fluoride or 0.25 to 0.375 mg of fluoride, like about 0.335 to 0.34 mg of fluoride.

17] Dispenser according to clause 13 or 16, wherein the fluoride comprises one or more of: sodium fluoride, stannous fluoride, and monofluorophosphate or a combination comprising one or more of these.

18] Dispenser according to one of the preceding clauses, further comprising a dose adjuster configured to adjust the dose of dentifrice to be dispensed.

19] Dispenser according to one of the preceding clauses, wherein the dispenser comprises an indicator and at least one status sensor, which is configured for sensing:
the degree of filling of the container,
and/or
the degree of use of the mouthpiece; and
wherein the indicator is connected with the status sensor and configured to generate an indicating signal representative for the degree sensed by the sensor or indicating when the degree sensed by the sensor is below respectively above a predetermined value.

20] Assembly comprising a dispenser according to one of the preceding clauses and a J-shaped or U-shaped mouthpiece configured for simultaneously encompassing and cleaning a plurality of dental positions with dentifrice dispensed by the dispenser and with cleaning elements provided on or in the mouthpiece.

21] System comprising:
a dental cleaner comprising a said J-shaped or U-shaped mouthpiece configured for simultaneously encompassing and cleaning a plurality of dental positions with cleaning elements provided on or in the mouthpiece, and
a storage station for storing a J-shaped or U-shaped mouthpiece when not used for cleaning teeth,
wherein the storage station comprises:
a dispenser according to one of the preceding clauses, and
a holder;
wherein the holder is configured for holding the J-shaped or U-shaped mouthpiece in a stored position such that, in the stored position, the mouthpiece is aligned along the J-shaped or U-shaped curvature so that dentifrice dispensed through the outlet openings of the dispenser will engage the mouthpiece on locations distributed along curvature.

22] System according to according to clause 21, wherein the dental cleaner further comprises a handle on which the mouthpiece is mounted, wherein the holder is a handle holder configured for receiving the handle such that the mouthpiece mounted on the handle is held in the stored position.

23] System according to clause 21 or 22, wherein the dental cleaner comprises a rechargeable battery, and wherein the storage station comprises a battery charger configured for charging contact with the battery when the mouthpiece is in the stored position.

24] System according to one of clauses 21-23, wherein the storage station further comprises a cleaning device configured for cleaning the mouthpiece when the mouthpiece is in the stored position.

25] System according to clause 24,
wherein the cleaning device comprises:
  a cistern for a cleaning liquid, the outlet openings of the
    dispenser being arranged in the cistern, and the
    cistern being configured for receiving the mouth-
    piece in the stored position; and
  a cleaning liquid supply for supplying cleaning liquid
    into the cistern;
wherein the cleaning device is configured for cleaning the
  mouthpiece with cleaning liquid supplied into the cis-
  tern.
26] System according to clause 25,
wherein the cleaning device further comprises a reservoir
  with cleaning liquid, the reservoir being operatively
  connected or connectable with the liquid supply for
  transferring cleaning liquid from the reservoir into the
  cistern.
27] System according to clause 26, wherein the reservoir
  is a replaceable cleaning cartridge.
28] System according to clause one of the clauses 25-27,
wherein the liquid supply is configured for introducing
  one or more pressurized jets of cleaning liquid into the
  cistern, the jets being directed onto the mouthpiece.
29] System according to one of the clauses 24-28,
wherein the dental cleaner is provided with a driving
  system configured for subjecting cleaning elements,
  such as bristles, to a to-and-fro movement,
wherein the cleaning device is configured to bring the
  mouthpiece in the cistern in contact with the cleaning
  liquid and to operate the driving system to subject the
  brushing elements to the to-and-fro movement when
  the mouthpiece is in the stored position in the cistern in
  contact with cleaning liquid.
30] System according to one of the clauses 21-29, further
  comprising a dose adjuster configured to adjust the
  dose of dentifrice to be dispensed in response to a user
  action or in response to a said mouthpiece arranged in
  the stored position.
31] Use of a dispenser according to one of the clauses
  1-19 or use of a system according to one of the clauses
  21-30 for applying dentifrice simultaneously onto mul-
  tiple locations on a J-shaped or U-shaped mouthpiece
  which is configured for simultaneously encompassing
  and treating a plurality of dental positions.
32] Method for applying dentifrice onto a J-shaped or
  U-shaped mouthpiece which is configured for simulta-
  neously encompassing and treating a plurality of dental
  positions, wherein the method uses a dispenser accord-
  ing to one of the clauses 1-19 or a system according to
  one of the clauses 21-30 to apply the dentifrice simul-
  taneously onto multiple locations on the mouthpiece.
The invention claimed is:
1. Dentifrice dispenser for dispensing a dentifrice onto a
J-shaped or U-shaped mouthpiece configured for simulta-
neously encompassing and cleaning a plurality of dental
positions with the dispensed dentifrice and with cleaning
elements provided on or in the mouthpiece,
  wherein the dispenser comprises a dispenser duct work
    having an inlet and a manifold;
  wherein the manifold comprises a multiple of outlet
    openings configured for dispensing dentifrice;
  wherein the dispenser duct work is configured for passing
    dentifrice from the inlet to the multiple of outlet
    openings;
  wherein the outlet openings are distributed along a
    J-shaped or U-shaped curvature and debouch towards
    and/or along the curvature, the curvature matching at least part of a dental arch comprising a molar, pre-
molars, a canine, and incisors such that the outlet
openings can dispense dentifrice simultaneously on a
multiple of locations along the curvature, the multiple
of locations corresponding to the multiple of outlet
openings; and
  wherein the dispenser is configured to allow, after denti-
    frice has been dispensed onto the mouthpiece, with-
    drawal of the mouthpiece from the manifold, and
    wherein the outlet openings are arranged at opposite
    sides of a plane defined by the curvature, and wherein
    the outlet openings are arranged in pairs mirrored with
    respect to the plane defined by the curvature.
2. Dispenser according to claim 1, wherein the curvature
is U-shaped, wherein the manifold is configured to adjust
one of the U-shaped curvature to the U-shaped mouthpiece
and the U-shaped mouthpiece to the U-shaped curvature,
wherein the multiple of outlet openings have a mutual
positioning, wherein the manifold is configured to adjust the
mutual positioning of the multiple of outlet openings to
conform the U-shaped curvature to the U-shaped mouth-
piece.
3. Dispenser according to claim 2,
  wherein the mouthpiece is a U-shaped mouthpiece having
    two leg parts connected by a central part,
  wherein the manifold comprises a W-shaped receiving
    dock having two adjacent reception bays separated by
    a central member,
  wherein the dock is configured to receive the leg parts of
    the U-shaped mouthpiece in the reception bays when
    the leg parts of the mouthpiece are inserted in an
    insertion direction into the reception bays,
  wherein each receiving bay has an outer side wall and an
    inner side wall, the inner side walls being defined by
    the central member,
  wherein, viewed in the insertion direction, the central
    member widens, and
  wherein, viewed in the insertion direction, the outer side
    walls taper with respect to each other.
4. Dispenser according to claim 1, further comprising a
container for dentifrice and a feed section connecting the
dentifrice container with the inlet for transfer of dentifrice
from the dentifrice container to the inlet.
5. Dispenser according to claim 4, wherein the dispenser
comprises an indicator and at least one status sensor, which
is configured for sensing:
  the degree of filling of the container, and/or
  the degree of use of the mouthpiece; and
  wherein the indicator is connected with the status sensor
    and configured to generate an indicating signal repre-
    sentative for the degree sensed by the sensor or indi-
    cating when the degree sensed by the sensor is below
    respectively above a predetermined value.
6. Dispenser according to claim 4, further comprising an
actuation mechanism configured for controlling the transfer
of dentifrice, through the feed section, from the container
into the inlet, wherein the actuation mechanism is further
configured to pressurize the dentifrice to be passed through
the duct work.
7. Dispenser according to claim 6, wherein the container
is dimensioned for containing a multiple of doses of denti-
frice, wherein the actuation mechanism is configured to
transfer one predetermined dose of dentifrice upon actuation
of the actuating mechanism, wherein the container is con-
figured for dispensing a predetermined dose or a dose
determined by a controller on the basis of input received from a sensor or user interface, and wherein one dose comprises 0.2 to 1.25 mg of fluoride.

8. Dispenser according to claim 4, wherein the container comprises dentifrice and wherein the dentifrice comprises one or more of:

a fluoride;

0.1-0.15 gram of an abrasive per dose of dentifrice, in which the abrasive may comprise one or more of aluminium hydroxide, calcium hydrogen phosphates, calcium carbonate, silica and hydroxyapatite or a combination comprising one or more of these;

15-80% of weight of water.

9. Dispenser according to claim 1, further comprising a dose adjuster configured to adjust the dose of dentifrice to be dispensed.

10. Assembly comprising a dispenser according to claim 1 and a J-shaped or U-shaped mouthpiece configured for simultaneously encompassing and cleaning a plurality of dental positions with dentifrice dispensed by the dispenser and with cleaning elements provided on or in the mouthpiece.

11. System comprising:

a dental cleaner comprising a said J-shaped or U-shaped mouthpiece configured for simultaneously encompassing and cleaning a plurality of dental positions with cleaning elements provided on or in the mouthpiece, and a storage station for storing the J-shaped or U-shaped mouthpiece when not used for cleaning teeth, wherein the storage station comprises:

a dispenser according to claim 1, and a holder;

wherein the holder is configured:

for holding the J-shaped or U-shaped mouthpiece in a stored position such that, in the stored position, the mouthpiece is aligned along the J-shaped or U-shaped curvature so that dentifrice dispensed through the outlet openings of the dispenser will engage the mouthpiece on locations distributed along curvature, and to allow, after dentifrice has been dispensed onto the mouthpiece, withdrawal of said mouthpiece from the holder.

12. System according to claim 11, wherein the dental cleaner further comprises a handle on which the mouthpiece is mounted, wherein the holder is a handle holder configured for receiving the handle such that the mouthpiece mounted on the handle is held in the stored position.

13. System according to claim 11, wherein the dental cleaner comprises a rechargeable battery, and wherein the storage station comprises a battery charger configured for charging contact with the battery when the mouthpiece is in the stored position.

14. System according to claim 11, wherein the storage station further comprises a cleaning device configured for cleaning the mouthpiece when the mouthpiece is in the stored position.

15. System according to claim 14, wherein the cleaning device comprises:

a cistern for a cleaning liquid, the outlet openings of the dispenser being arranged in the cistern, and the cistern being configured for receiving the mouthpiece in the stored position; and a cleaning liquid supply for supplying cleaning liquid into the cistern;

wherein the cleaning device is configured for cleaning the mouthpiece with cleaning liquid supplied into the cistern; and wherein the liquid supply is configured for introducing one or more pressurized jets of cleaning liquid into the cistern, the jets being directed onto the mouthpiece.

16. System according to claim 15, wherein the cleaning device further comprises a reservoir with cleaning liquid, the reservoir being operatively connected or connectable with the liquid supply for transferring cleaning liquid from the reservoir into the cistern; and wherein the reservoir is a replaceable cleaning cartridge.

17. System according to claim 14, wherein the dental cleaner is provided with a driving system configured for subjecting cleaning elements to a to-and-fro movement, wherein the cleaning device is configured to bring the mouthpiece in the cistern in contact with the cleaning liquid and to operate the driving system to subject the brushing elements to the to-and-fro movement when the mouthpiece is in the stored position in the cistern in contact with cleaning liquid.

18. System according to claim 11, further comprising a dose adjuster configured to adjust the dose of dentifrice to be dispensed in response to a user action or in response to a said mouthpiece arranged in the stored position.

19. Method for applying dentifrice onto a J-shaped or U-shaped mouthpiece which is configured for simultaneously encompassing and treating a plurality of dental positions, wherein the method uses a system according to claim 11 to apply the dentifrice simultaneously onto multiple locations on the mouthpiece.

* * * * *